(12) United States Patent
Gray et al.

(10) Patent No.: US 9,137,670 B2
(45) Date of Patent: Sep. 15, 2015

(54) METHOD FOR DETECTING ROGUE DEVICES OPERATING IN WIRELESS AND WIRED COMPUTER NETWORK ENVIRONMENTS

(75) Inventors: Gordon P. Gray, Menlo Park, CA (US); Anthony Glenn Burke, Frisco, TX (US); Jason E. Luther, Montclair, NJ (US)

(73) Assignee: Hewlett-Packard Development Company, L.P., Houston, TX (US)

(*) Notice: Subject to any disclaimer, the term of this patent is extended or adjusted under 35 U.S.C. 154(b) by 256 days.

(21) Appl. No.: 12/401,553

(22) Filed: Mar. 10, 2009

(65) Prior Publication Data

US 2009/0235354 A1    Sep. 17, 2009

Related U.S. Application Data

(63) Continuation-in-part of application No. 11/869,624, filed on Oct. 9, 2007, which is a continuation of application No. 10/368,152, filed on Feb. 18, 2003, now Pat. No. 7,295,524.

(51) Int. Cl.
| | |
|---|---|
| H04W 12/12 | (2009.01) |
| H04L 29/06 | (2006.01) |
| H04W 24/08 | (2009.01) |
| H04L 12/24 | (2006.01) |
| H04W 8/00 | (2009.01) |
| H04W 24/10 | (2009.01) |
| H04W 88/08 | (2009.01) |

(52) U.S. Cl.
CPC ........... *H04W 12/12* (2013.01); *H04L 63/1408* (2013.01); *H04L 63/1416* (2013.01); *H04W 24/08* (2013.01); *H04L 41/0213* (2013.01); *H04W 8/005* (2013.01); *H04W 24/10* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 6,047,325 | A | 4/2000 | Jain et al. |
| 6,115,376 | A | 9/2000 | Sherer et al. |
| 6,347,091 | B1 | 2/2002 | Wallentin et al. |
| 6,363,421 | B2 | 3/2002 | Barker et al. |
| 6,493,698 | B1 | 12/2002 | Beylin |
| 6,567,405 | B1 | 5/2003 | Borella et al. |
| 6,674,738 | B1 | 1/2004 | Yildiz et al. |
| 6,693,888 | B2 | 2/2004 | Cafarelli et al. |
| 6,708,218 | B1 | 3/2004 | Ellington, Jr. et al. |

(Continued)

OTHER PUBLICATIONS

Beyah et al. "Rogue Access Point Detection using Temporal Traffic Characteristics", 2004, IEEE Communications Society, Globecom 2004, 0-7803-8794-5/04. p. 2272.*

(Continued)

*Primary Examiner* — Jung Kim
*Assistant Examiner* — Adrian Stoica

(57) ABSTRACT

A management of wireless and wired computer network environments in which rogue and other devices that may affect the performance and/or security of the wireless computer network can be detected. Specifically, the present invention discloses a method and system of detecting all interfaces, Media Access Control (MAC) addresses and radio MAC addresses (BSSIDs) affiliated with a rogue device and compiling this information into a database. As a result, the present invention reduces the number of alerts that one rogue device can generate and increases the accuracy and speed of locating the rogue device within a network.

21 Claims, 17 Drawing Sheets

(56) References Cited

U.S. PATENT DOCUMENTS

| | | | |
|---|---|---|---|
| 6,728,782 | B1 | 4/2004 | D'Souza et al. |
| 6,792,395 | B2 | 9/2004 | Roberts |
| 6,865,673 | B1 | 3/2005 | Nessett et al. |
| 6,917,804 | B2 | 7/2005 | Takayama et al. |
| 6,954,790 | B2 | 10/2005 | Forslow |
| 6,957,067 | B1 | 10/2005 | Iyer et al. |
| 6,965,929 | B2 | 11/2005 | Kumar |
| 7,039,027 | B2 | 5/2006 | Bridgelall |
| 7,042,852 | B2 * | 5/2006 | Hrastar .................. 370/310 |
| 7,068,999 | B2 | 6/2006 | Ballai |
| 7,110,762 | B1 | 9/2006 | Cameron et al. |
| 7,181,530 | B1 | 2/2007 | Halasz et al. |
| 7,203,195 | B2 | 4/2007 | Hidaka et al. |
| 7,295,524 | B1 | 11/2007 | Gray et al. |
| 7,376,113 | B2 | 5/2008 | Taylor et al. |
| 7,969,950 | B2 | 6/2011 | Iyer et al. |
| 2001/0056550 | A1 | 12/2001 | Lee |
| 2002/0015422 | A1 | 2/2002 | Inada et al. |
| 2002/0069278 | A1 | 6/2002 | Forslow |
| 2002/0087882 | A1 | 7/2002 | Schneier et al. |
| 2002/0099503 | A1 | 7/2002 | Mishra et al. |
| 2002/0159418 | A1 | 10/2002 | Rudnick et al. |
| 2002/0191548 | A1 | 12/2002 | Ylonen et al. |
| 2003/0017826 | A1 | 1/2003 | Fishman et al. |
| 2003/0018760 | A1 | 1/2003 | Putzolu et al. |
| 2003/0023711 | A1 | 1/2003 | Parmar et al. |
| 2003/0031151 | A1 | 2/2003 | Sharma et al. |
| 2003/0039234 | A1 | 2/2003 | Sharma et al. |
| 2003/0123420 | A1 | 7/2003 | Sherlock |
| 2003/0135762 | A1 * | 7/2003 | Macaulay ................ 713/201 |
| 2003/0142641 | A1 | 7/2003 | Sumner et al. |
| 2003/0196105 | A1 | 10/2003 | Fineberg |
| 2003/0219008 | A1 * | 11/2003 | Hrastar .................. 370/352 |
| 2003/0221006 | A1 | 11/2003 | Kuan et al. |
| 2003/0231649 | A1 | 12/2003 | Awoseyi et al. |
| 2004/0003285 | A1 * | 1/2004 | Whelan et al. ........... 713/201 |
| 2004/0023640 | A1 * | 2/2004 | Ballai .................... 455/411 |
| 2004/0049699 | A1 | 3/2004 | Griffith et al. |
| 2004/0068668 | A1 | 4/2004 | Lor et al. |
| 2004/0090943 | A1 * | 5/2004 | da Costa et al. ........ 370/338 |
| 2004/0137915 | A1 | 7/2004 | Diener et al. |
| 2004/0203593 | A1 | 10/2004 | Whelan et al. |
| 2004/0209621 | A1 | 10/2004 | Teshirogi |
| 2005/0107041 | A1 | 5/2005 | Eder |
| 2005/0114649 | A1 * | 5/2005 | Challener et al. ......... 713/155 |
| 2005/0245269 | A1 | 11/2005 | Demirhan et al. |
| 2005/0281234 | A1 | 12/2005 | Kawamura et al. |
| 2005/0285803 | A1 | 12/2005 | Iacono et al. |
| 2006/0013188 | A1 | 1/2006 | Wiatrowski et al. |
| 2006/0069526 | A1 * | 3/2006 | Kaiser et al. .............. 702/150 |
| 2006/0126659 | A1 | 6/2006 | Baum et al. |
| 2006/0225109 | A1 | 10/2006 | Seo |
| 2007/0053362 | A1 | 3/2007 | Garg |
| 2007/0078974 | A1 | 4/2007 | Venkatraman |
| 2007/0160003 | A1 | 7/2007 | Meier |
| 2007/0230361 | A1 * | 10/2007 | Choudhury .............. 370/250 |
| 2007/0294747 | A1 * | 12/2007 | Rosenberger ................ 726/4 |
| 2007/0298720 | A1 * | 12/2007 | Wolman et al. ........... 455/66.1 |
| 2008/0080420 | A1 | 4/2008 | Iyer et al. |
| 2008/0175166 | A1 | 7/2008 | Oerton |
| 2008/0181184 | A1 | 7/2008 | Kezys |
| 2008/0253327 | A1 | 10/2008 | Kohvakka et al. |
| 2009/0013073 | A1 * | 1/2009 | Chaskar et al. ............ 709/224 |
| 2009/0016529 | A1 * | 1/2009 | Gopinath et al. .......... 380/270 |
| 2009/0028118 | A1 | 1/2009 | Gray et al. |
| 2009/0235354 | A1 | 9/2009 | Gray et al. |
| 2009/0271864 | A1 * | 10/2009 | Dietrich et al. ........... 726/23 |

OTHER PUBLICATIONS

Mogul et al., Internet Standard Subnetting Procedure, Aug. 1985, Network Working Group, RFC 950, p. 7.*
Darwin Engwer, IEEE 802.11-05/0710r0 "WDS" Clarifications, 2005, IEEE, pp. 1-14.*
Mustafa Ergen, IEEE 802.11 Tutorial, 2002, University of California Berkley, pp. 1-93.*
Case et al., Table of Content of "A Simple Network Management Protocol (SNMP)—Request for Comments: 1157" (1990).
U.S. Appl. No. 11/542,327 Office Action mailed Jun. 28, 2011.
U.S. Appl. No. 10/368,152 Office Action mailed Jun. 15, 2007.
U.S. Appl. No. 10/368,152 Office Action mailed Jan. 18, 2007.
U.S. Appl. No. 11/542,327 Office Action mailed Nov. 24, 2010.
U.S. Appl. No. 11/542,327 Office Action mailed Jun. 29, 2010.
J. Case et al., "RFC 1157—A Simple Network Management Protocol (SNMP)", 1990, pp. cover.
U.S. Appl. No. 11/542,327 Office Action mailed May 28, 2009.
U.S. Appl. No. 11/542,327 Office Action mailed Nov. 12, 2008.
U.S. Appl. No. 11/542,327 Office Action mailed Jan. 6, 2010.
U.S. Appl. No. 11/869,624 Office Action mailed Mar. 2, 2011.
U.S. Appl. No. 11/869,624 Office Action mailed Jul. 19, 2011.
U.S. Appl. No. 11/869,624 Office Action mailed Nov. 29, 2011.
U.S. Appl. No. 11/869,624 Office Action mailed Apr. 4, 2012.
U.S. Appl. No. 11/869,624, Final Office Action, mailed Sep. 13, 2012.
U.S. Appl. No. 11/869,624, Final Office Action, mailed Jul. 19, 2011.
U.S. Appl. No. 11/869,624, Notice of Allowance, mailed Sep. 3, 2013.
Non-Final Office Action of Dec. 16, 2014, for U.S. Appl. No. 14/472,712, 11 pages.
Non-Final Office Action of Oct. 23, 2014 for U.S. Appl. No. 14/469,510, 7 pages.

* cited by examiner

| AP: | Group: | SSID: | Ch: | Status: | Type: | Users: | Uptime: | BW (kbps): | LAN IP: | LAN MAP: |
|---|---|---|---|---|---|---|---|---|---|---|
| Executive Floor | Corporate/LEAP | corporate | 11 | UP | Cisco Aironet1200 | 1 | 1 day, 12hrs, 36min | 8 | 10.200.0.19 | 00:09:87 |
| Gast:Zugangspunkt | Guest Network/WG | guest | 11 | UP | ORINOCO AP-500 | 3 | 4hrs,15min | 48 | 10.200.0.101 | 00:30:65 |
| RMA Repairs | Manufacturing/WEP | manufacturing | 8 | UP | ORINOCO AP-2000 | 0 | 3hrs,55min | 16 | 192.168.89.63 | 00:02:20 |
| RND | Engineering/802.1x | engineering | 1 | UP | CiscoAironet350 | 0 | 3hrs,55min | 18 | 192.168.89.48 | 00:40:96 |
| SF Conference Rm | Guest Network/WG | guest | 11 | UP | ORINOCO AP-500 | 0 | 10min | 0 | 10.10.1.33 | 00:30:65 |
| Shipping and Receiving | Manufacturing/WEP | manufacturing | 11 | UP | ORINOCO AP-1000 | 1 | 3hrs,52min | 9 | 192.168.89.20 | 00:02:20 |
| Southern Scanner | Scanners | scanners | 1 | UP | 3e AP | 0 | 3hrs,49min | 1 | 10.200.0.6 | 00:03:83 |

FIG. 2

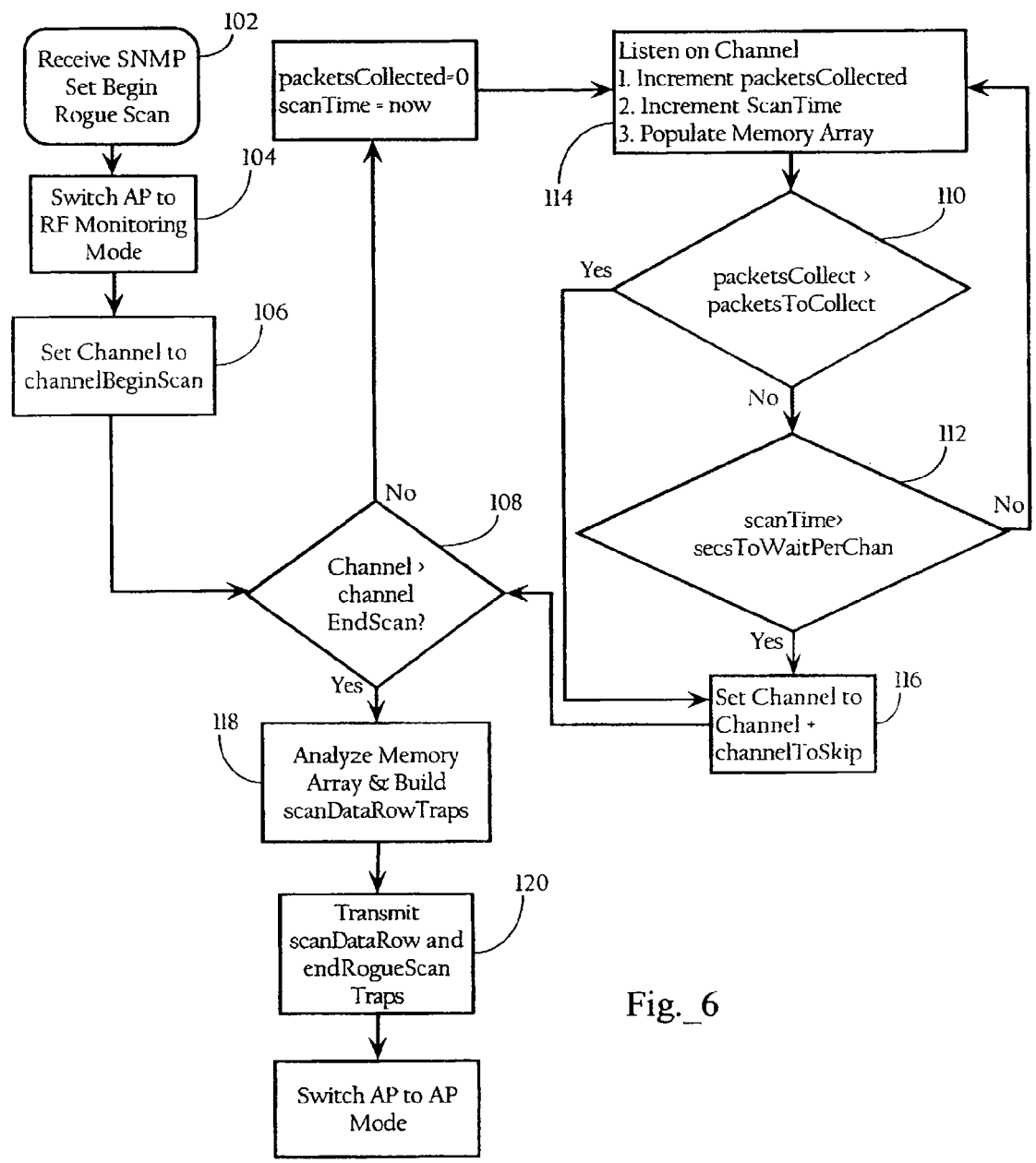
Fig._6

| AP MEMORY BUFFER DURING ROGUE AP SCAN | | | | | | | |
|---|---|---|---|---|---|---|---|
| SCANNING CHANNEL | PACKET TYPE | BSSID | CLIENT MAC | SSID | WEP | TYPE | CHANNEL | RSSI |
| 1 | DATA | 00:02:2D:03:4C:B0 | 00:02:2D:56:5B:FF | | NO | CLIENT | 1 | |
| 2 | DATA | 00:02:2D:03:4C:B0 | 00:02:2D:56:5B:FF | | NO | CLIENT | 2 | |
| 3 | BEACON | 00:02:2D:03:4C:B0 | | AirPort NETWORK | NO | AP | 1 | 30 |
| 3 | DATA | 00:02:2D:03:4C:B0 | 00:02:2D:56:5B:FF | | NO | CLIENT | 3 | |
| 4 | BEACON | 00:02:2D:03:4C:B0 | | AirPort NETWORK | NO | AP | 1 | 26 |
| 5 | DATA | 00:03:2F:00:12:AE | 00:06:25:0D:6E:16 | | NO | CLIENT | 5 | |
| 6 | DATA | 00:03:2F:00:12:AE | 00:06:25:0D:6E:16 | | NO | CLIENT | 6 | |
| 7 | DATA | 00:03:2F:00:12:AE | 00:06:25:0D:6E:16 | | NO | CLIENT | 7 | |
| 8 | NO DATA | | | | | | | |
| 9 | DATA | 00:02:2D:0D:4D:7C | 00:06:25:0D:AA:11 | | NO | CLIENT | 9 | |
| 10 | DATA | 00:02:2D:0D:4D:7C | 00:06:25:0D:AA:11 | | NO | CLIENT | 10 | |
| 11 | DATA | 00:02:2D:0D:4D:7C | 00:06:25:0D:AA:11 | | NO | CLIENT | 11 | |

| POST ANALYSIS DATA SENT VIA SNMP TRAPS TO AMP FROM SCANNING AP | | | | | | | |
|---|---|---|---|---|---|---|---|
| awAPScanID | awAPReturnBSSID | awAPReturnSSID | awAPReturnChannel | awAPReturnWepOn | awAPReturnType | awAPReturnRSSI | awAPReturnCLMAC |
| 00:03:2F:00:79:FE | 00:02:2D:03:4C:B0 | AirPort NETWORK | 1 | 1 | 1 | 28 | |
| 00:03:2F:00:79:FE | 00:02:2D:03:4C:B0 | AirPort NETWORK | 1 | 1 | 2 | | 00:02:2D:56:5B:FF |
| 00:03:2F:00:79:FE | 00:03:2F:00:12:AE | | 6 | | 2 | | 00:06:25:0D:6E:16 |
| 00:03:2F:00:79:FE | 00:02:2D:0D:4D:7C | | 11 | | 2 | | 00:06:25:0D:AA:11 |

FIG. 8

Data Retrieved from Device

| BSSID | dBm | SSID | Ch | Security |
|---|---|---|---|---|
| 00:0E:38:49:08:30 | -72 | AAA | 11 | yes |

| | Port |
|---|---|
| LAN MAC 00:0E:38:49:08:29 | 22 |

| | IP |
|---|---|
| LAN MAC 00:0E:38:49:08:29 | 10.1.1.1 |

Database Record

| Rogue Radio ID | Score | BSSID | AP ID that heard Rogue | Radio Index that heard Rogue | First heard | Last heard | dBm | SSID | Ch | Security |
|---|---|---|---|---|---|---|---|---|---|---|
| 23 | 5 | 00:0E:38:49:08:30 | 11 | 1 | 9/1/2007 9:02 | 10/1/2007 10:00 | -72 | AAA | 11 | yes |
| 23 | 5 | 00:0E:38:49:08:30 | 10 | 2 | 9/11/2007 9:02 | 09/11/2007 10:00:00 AM | -72 | AAA | 11 | yes |

| | LAN MAC | | AP ID | Discovered |
|---|---|---|---|---|
| | 00:0E:38:49:08:30 | | Switch corp.switch | 10/1/2007 10:00 |

| | LAN MAC | | AP ID | Discovered | IP |
|---|---|---|---|---|---|
| | 00:0E:38:49:08:30 | | Switch corp.switch | 10/1/2007 10:00 | 10.1.1.1 |

Figure 13

| ROGUE DEVICE MASTER GENERAL | |
|---|---|
| NAME: | CISCO ROGUE AP |
| ROOT LAN MAC: | 00:0E:38:49:08:20 |
| ROOT RADIO1 BSSID: | 00:0E:38:49:08:30 |
| ROOT RADIO2 BSSID: | 00:0E:38:49:08:38 |
| MANUFACTURER: | CISCO |
| TYPE: | AP |

| ROGUE DEVICE MASTER ADDITIONAL | |
|---|---|
| FIRST DISCOVERED | 9/1/2007 |
| LAST DISCOVERED | 10/2/2007 |
| OS | VxWORKS |
| PORT BW | 14 KBPS |
| PoE | YES |
| HIGHEST SCORE: | 7 |
| TOTAL RADIOS HEARD BY: | 2 |

WIRELESS INTERFACE LIST

| BSSID | dBm | PHY | SSID | CHANNEL | SECURITY | FIRST DISCOVERED | LAST DISCOVERED |
|---|---|---|---|---|---|---|---|
| 00:0E:38:49:08:30 | -72 | 11g | AAA | 11 | YES | 9/1/2007 | 10/1/2007 |
| 00:0E:38:49:08:31 | -70 | 11g | BBB | 11 | NO | 9/1/2007 | 10/1/2007 |
| 00:0E:38:49:08:32 | -75 | 11g | YYY | 11 | YES | 9/1/2007 | 9/1/2007 |
| 00:0E:38:49:08:38 | -80 | 11a | ZZZ | 54 | NO | 9/1/2007 | 9/1/2007 |

WIRED INTERFACE LIST

| MAC | SWITCH | PORT | IP | DNS | FIRST DISCOVERED | LAST DISCOVERED |
|---|---|---|---|---|---|---|
| 00:0E:38:49:08:20 | CORP.SWITCH | 20 | 10.1.1.1 | | 9/1/2007 | 10/1/2007 |

DISCOVERED BY RADIO LIST

| BSSID | AP NAME | TYPE | SSID | CHANNEL | SECURITY | FIRST DISCOVERED | LAST DISCOVERED |
|---|---|---|---|---|---|---|---|
| 00:14:C2:A0:4E:FC | AP1 | SYMBOL 4131 | AAA | 11 | YES | 9/1/2007 | 10/1/2007 |
| 00:14:C2:A0:4E:B0 | AP2 | SYMBOL 4131 | BBB | 11 | NO | 9/1/2007 | 10/1/2007 |

DISCOVERED ON SWITCH LIST

| LAN/MAC | SWITCH | PORT | IP | PoE | 802.1x | FIRST DISCOVERED | LAST DISCOVERED |
|---|---|---|---|---|---|---|---|
| 00:0E38:49:08:20 | SWITCH1 | 20/4 | 10.1.1.1 | YES | YES | 9/1/2007 | 10/1/2007 |
| 00:0E38:49:08:20 | SWITCH2 | 21/4 | 10.1.1.2 | NO | YES | 9/1/2007 | 10/1/2007 |

VIEW ON MAP

FIG. 15

METHOD FOR DETECTING ROGUE DEVICES OPERATING IN WIRELESS AND WIRED COMPUTER NETWORK ENVIRONMENTS

CROSS REFERENCE TO RELATED APPLICATIONS

This application is a continuation-in-part of U.S. patent application Ser. No. 11/869,624, entitled METHODS, APPARATUSES AND SYSTEMS FACILITATING MANAGEMENT OF AIRSPACE IN WIRELESS COMPUTER NETWORK ENVIRONMENTS, which is a divisional of U.S. Pat. No. 7,295,524, entitled METHODS, APPARATUSES AND SYSTEMS FACILITATING MANAGEMENT OF AIRSPACE IN WIRELESS COMPUTER NETWORK ENVIRONMENTS, filed Feb. 18, 2003, and issuing on Nov. 13, 2007. The contents of both U.S. patent application Ser. No. 11/869,624 and U.S. Pat. No. 7,295,524 are incorporated herein by reference into the present application.

FIELD OF THE INVENTION

The present invention relates to wireless and wired computer networks and, more particularly, to methods, apparatuses and systems for the management of wireless and wired computer network environments, in which rogue and other devices that may affect the performance and/or security of the wireless computer network can be detected.

BACKGROUND OF THE INVENTION

In 1997, the Institute of Electrical and Electronics Engineers (IEEE) approved 802.11 the first internationally sanctioned wireless local area network (WLAN) standard. The IEEE 802.11 standard establishes specifications for the parameters of both the physical (PHY) and media access control (MAC) layers of the network. The IEEE ratified the original 802.11 standards as the standard for WLANs. The initial standard provided 1 Mbps and 2 Mbps transmission rates. This rate of transmission was not sufficient for most general business applications and consequently the rate of adoption was slow.

Recognizing the need for faster transmission speeds, the IEEE ratified the 802.11b standard to allow for transmission speeds of up to 11 Mbps. The new standard aligns wireless connectivity on comparable levels to wired Ethernet LANs. The range for WLANs depends largely on the medium by which the radio waves are transmitted and the strength of the transmitting antenna. Ranges in open air are much longer than in areas comprising several walls between antennas. Depending on the type of radio antenna (omni-directional, bi-directional, etc.) and transmitter strength, optimal distances can vary from 200 feet to 10 miles. Fallback speeds of 5.5, 2, and 1 Mbps occur when optimal distances for transmission are exceeded.

The first 802.11 standard proposed three implementations for the Physical Layer (PHY): Infrared (IR) Pulses Position Modulation, RF Signaling using Frequency Hopping Spread Spectrum (FHSS), and Direct Sequence Spread Spectrum (DSSS). Two working groups were established to explore alternate implementations of the 802.11 standard. Working Group A explored the 5.0 GHz band, while Working Group B focused on the 2.4 GHz band. Wireless communications take place within an area known as the Basic Service Area defined by the propagation characteristics of the wireless medium. A wireless node communicates via a Basic Service Set (BSS) within a basic service area. There are two basic service sets: independent and infrastructure. The independent service set allows wireless stations to operate in a peer-to-peer or ad hoc mode. In the ad hoc network, computers are brought together to form a network "on the fly." There is no structure to the network; there are no fixed points; and usually every node is able to communicate with every other node. Although it seems that order would be difficult to maintain in this type of network, algorithms such as the spokesman election algorithm (SEA) have been designed to select one wireless node as the base station (master) of the network with the others being slaves. The infrastructure service set is the more common approach involving access points (APs) that allow for and control access to the wireless network. An access point usually contains a transceiver, a wired network interface (e.g., 802.3) and software for data processing. If service areas of access points overlap, handoffs of wireless clients between access points can occur.

Wireless local area networks (WLANs), need their air space to be consistently mapped in order to maintain optimum speed and reliability. In an Ethernet LAN (IEEE 802.3), the Carrier Sense Multiple Access with Collision Detection (CSMA/CD) protocol establishes how simultaneous transmissions (packet collisions) are handled. In a WLAN, collision detection in this manner is not possible due to what is known as the "near/far" problem: to detect a collision, a station must be able to transmit and listen at the same time. To account for this difference, the 802.11 protocol uses a slightly different protocol known as Carrier Sense Multiple Access with Collision Avoidance (CSMA/CA) or the Distributed Coordination Function (DCF). CSMA/CA attempts to avoid packet collisions by using explicit packet acknowledgement (ACK), which means that an ACK packet is sent by the receiving station to confirm that a packet arrived intact. CSMA/CA works by having the transmitting wireless station sense the air. If there is no activity detected, the transmitting wireless station will wait an additional random period of time. If there still is no activity, the wireless station transmits the data. If the packet is received intact, the receiving station will send and ACK frame that, once received by the original sender, completes the transmission. If the ACK command is not received in a specified random period of time, the data packet will be resent, with the assumption that the original packet experienced a collision. CSMA/CA will also handle other interference and radio-wave related problems effectively, but creates considerable overhead.

Given the collision avoidance mechanisms employed in 802.11-compliant wireless networks, management and monitoring of the wireless network airspace is critical to the performance of the wireless network environment (for example, to ensure that wireless access points do not interfere with one another). The administrative or management functionality associated with WLAN networks, however, generally lacks a reliable and accurate means of collecting, storing, and relating airspace data. Hand-held scanners, AP startup scans, or full-time scanning devices are the current methods of obtaining WLAN air space data. However, these methods are inherently flawed or not cost effective. Accordingly, most WLANs do not perform at optimum speed due to overlapping channel interference and rogue access points (i.e., access points installed without authorization and/or knowledge of a network administrator).

In light of the foregoing, there exists a need in the art for methods, apparatuses and systems that allow for efficient mapping of the air space associated with wireless networks. A need further exists for methods, apparatuses and systems that facilitate detection of rogue or unauthorized wireless access points.

SUMMARY OF THE INVENTION

The present invention provides methods, apparatuses and systems facilitating the management of wireless computer and wired computer network environments and the detection of rogue and other devices that may affect the performance and/or security of the wireless computer network. The present invention enables accurate and cost effective WLAN air space mapping. In one embodiment, the present invention allows any conforming access point the ability to routinely scan its airspace, collect data on all operating frequencies and report this information back to a management platform. Management and reporting functionality described herein uses a standards-based vehicle, such as Simple Network Management Protocol (SNMP). The present invention allows for detection of all wireless traffic within or affecting an enterprise's computer network environment, picking up all active access points (ad hoc or infrastructure) and all wireless clients data regardless of SSID, channel, or security settings. The management platform, according to an embodiment of the present invention, analyzes information received from the access points under management to detect and report the state of the computer network environment. The present invention facilitates isolation of rogue wireless devices affecting the computer network environment and effective decision-making as to management of the detected device. The present invention also allows network administrators to optimize the configuration of the wireless network environment for performance and security.

The present invention also discloses management of wireless and wired computer network environments in which rogue and other devices that may affect the performance and/or security of the wireless computer network can be detected. Specifically, the present invention discloses a method and system of detecting all interfaces, Media Access Control (MAC) addresses and radio MAC addresses (BSSIDs) affiliated with a rogue device and compiling this information into a database. As a result, the present invention reduces the number of alerts that one rogue device can generate and increases the accuracy and speed of locating the rogue device within a network.

In one aspect, the present invention is directed to a method of identifying Media Access Control addresses of rogue devices operating in a hybrid network, the method comprising: identifying Basic Service Set Identifiers for devices operating on a wireless network; creating a rogue discovery event for at least one of the Basic Service Set Identifiers of a device not authorized to operate in the hybrid network; determining a root Basic Service Set Identifier from the rogue discovery event; assigning the root Basic Service Set Identifier to a rogue device record; searching the hybrid network for wired devices associated with the root Basic Service Set Identifier and determining corresponding Media Access Control addresses for the located wired devices; and comparing the Media Access Control addresses with a plurality of octets of the root Basic Service Set Identifier in the rogue device record.

In another aspect of the present invention, the method further comprises assigning a score to the rogue discovery event based on security risk.

In another aspect of the present invention, the method further comprises comparing the identified Basic Service Set Identifiers with a list of Basic Service Set Identifiers of devices controlled by a management platform to determine whether the corresponding device is authorized to operate in the hybrid network.

In another aspect of the present invention, the method further comprises mapping a radio frequency environment from the rogue discovery event.

In another aspect of the present invention, the method further comprises locating each of the devices operating on the wireless network via a triangulation method.

In another aspect of the present invention, the method further comprises determining channel information from the rogue discovery event.

In another aspect of the present invention, the method further comprises determining security information from the rogue discovery event.

In another aspect of the present invention, the method further comprises determining signal strength from the rogue discovery event.

In another aspect of the present invention, the method further comprises identifying a device having the closest address when more than one Media Access Control addresses match the root Basic Service Set Identifier in the rogue device record.

In another aspect of the present invention, the method further comprises analyzing all rogue discovery events for the at least one of the Basic Service Set Identifiers to determine a virtual Basic Service Set Identifier.

In another aspect of the present invention, the method further comprises creating a rogue interface record for the virtual Basic Service Set Identifier.

In another aspect of the present invention, the method further comprises creating a rogue interface record for the root Basic Service Set Identifier.

In another aspect of the present invention, the comparing step further comprises comparing the Media Access Control addresses with a first five octets of the root Basic Service Set Identifier in the rogue device record.

In another aspect of the present invention, the method further comprises creating additional rogue interface records for each of the Media Access Control addresses that correspond to the first five octets of the root Basic Service Set Identifier.

In another aspect of the present invention, the method further comprises searching the additional rogue interface records for the Media Access Control addresses having corresponding Internet Protocol addresses.

In another aspect of the present invention, the method further comprises querying at least one of the Internet Protocol addresses to determine an operating system of the corresponding rogue device.

In another aspect of the present invention, the searching step further comprises reading bridge forwarding tables on a switch to find the wired devices.

In another aspect of the present invention, the method further comprises the searching step further comprises reading address resolution protocol tables of a router to find the wired devices.

In another aspect, the present invention is further directed to a system for performing a computer-based method of identifying Media Access Control addresses of rogue devices operating in a hybrid network, comprising a computer having a memory and a processor; and a computer-readable medium configured to generate software code, which, when said code is loaded into the memory and run by the processor, causes the processor to perform the steps of identifying Basic Service Set Identifiers for devices operating on a wireless network; creating a rogue discovery event for at least one of the Basic Service Set Identifiers of a device not authorized to operate in the hybrid network; determining a root Basic Service Set Identifier from the rogue discovery event; assigning the root Basic Service Set Identifier to a rogue device record; searching the hybrid network for wired devices associated with the root Basic Service Set Identifier and determining corresponding Media Access Control addresses for the located wired devices; and comparing the Media Access Control addresses with a plurality of octets of the root Basic Service Set Identifier in the rogue device record.

In another aspect, the present invention is further directed to a system for performing a computer-based method of identifying Media Access Control addresses of rogue devices operating in a hybrid network, comprising a computer having a memory and a processor; and a computer-readable medium configured to generate software code, which, when said code is loaded into the memory and run by the processor, causes the processor to perform the steps of identifying Basic Service Set Identifiers for devices operating on a wireless network; creating a rogue discovery event for at least one of the Basic Service Set Identifiers of a device not authorized to operate in the hybrid network; determining a root Basic Service Set Identifier from the rogue discovery event; assigning the root Basic Service Set Identifier to a rogue device record; assigning a score to the rogue discovery event based on security risk; searching the rogue discovery event to determine a virtual Basic Service Set Identifier; searching the hybrid network for wired devices associated with the root Basic Service Set Identifier and determining corresponding Media Access Control addresses for the located wired devices; comparing the Media Access Control addresses with a first five octet of the root Basic Service Set Identifier in the rogue device record; creating a rogue interface record for the virtual Basic Service Set Identifier, the root Basic Service Set Identifier and for Media Access Control addresses that correspond to the first five octets of the root Basic Service Set Identifier; searching the additional rogue interface records for the Media Access Control addresses having Internet Protocol addresses; and displaying a location of at least one rogue device.

DESCRIPTION OF THE DRAWINGS

FIG. 2 shows a user interface providing a detailed list of managed wireless access points;

FIG. 6 is a flow chart diagram showing a method, according to one embodiment, for scanning at an access point for rogue devices;

FIG. 8 illustrates a memory buffer constructed during a scan for rogue devices and a table illustrating the elements of SNMP traps summarizing the data in the memory buffer;

FIG. 13 illustrates an example of data retrieved from the device and the database record according to an exemplary embodiment;

FIG. 15 illustrates a screen display showing a list of all interfaces on a rogue device in accordance with an exemplary embodiment.

DESCRIPTION OF PREFERRED EMBODIMENT(S)

I. Computer Network Environment

Figure 1:
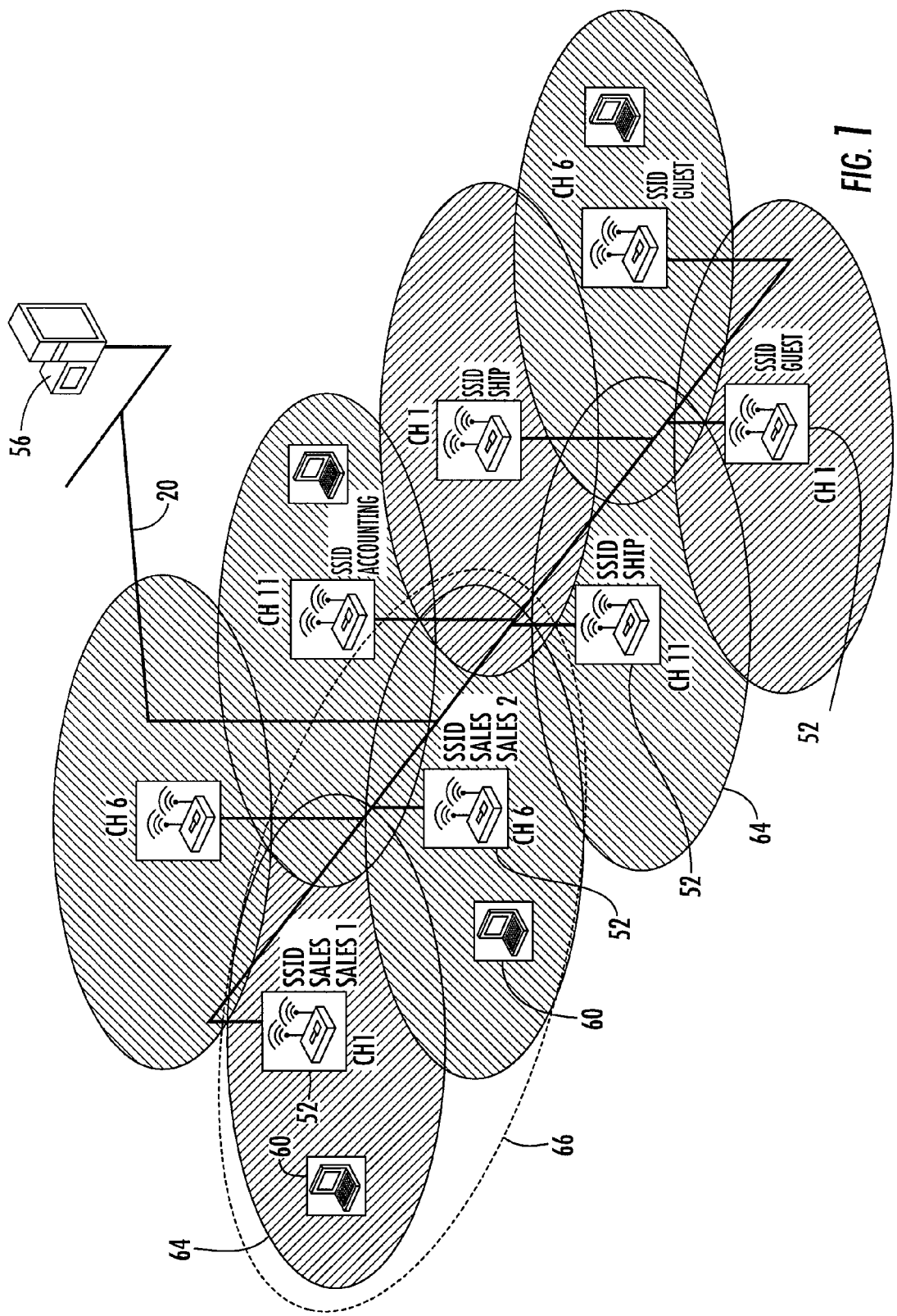
FIG. 1 is a diagram illustrating a wireless computer network environment according to an embodiment of the present invention.

FIG. 1 illustrates a computer network environment including an embodiment of the present invention. As FIG. 1 illustrates, the present invention, in one embodiment, operates in a computer network environment including a local area network (LAN) 20 interconnecting a plurality of hosts or other end systems, such as servers, network computers, etc., airspace management platform 56, and at least one wireless access point 52. Other computer network environments are possible. For example, while FIG. 1 illustrates that airspace management platform 56 and the at least one wireless access point 52 are connected via a LAN 20, embodiments of the present invention can be deployed across a wide area network, such as the Internet, to allow a network administrator to remotely manage one to a plurality of network access points 52 from distant locations.

Wireless access points 52 can act as a hub to route data between wireless client devices 60 within its coverage area, and/or bridge network traffic between a computer network 20 and one or more wireless client devices 60. A Basis Service Set (BSS) 64 refers to the wireless network implemented by a given wireless access point 52 that manages and bridges wireless communications for all wireless client devices 60 within its operating range (Basic Service Area (BSA) and operating on the same frequency channel (see FIG. 1). In 802.11-compliant wireless networks, a Service Set Identifier (SSID), a unique, 32-character identifier attached to the header of data packets transmitted over a WLAN, acts as a form of password or token when wireless client devices 60 attempt to connect to a Basic Service Set. The SSID differentiates one WLAN from another in that all wireless client devices 60 attempting to connect to a specific WLAN must use the same SSID. An Extended Service Set (ESS) 66 refers to two or more Basic Service Sets, having the same SSID, that are interconnected by a Distribution System (DS) (such as an Ethernet LAN 20), which provides a set of services enabling the transport of data between BSSs.

Wireless access point 52 is operative to dynamically recognize new users/wireless client devices 60 and wirelessly communicate with one to a plurality of wireless client devices 60. Wireless access point 52 includes a radio frequency transmitter/receiver unit or an infrared transmitter receiver unit, or both. However, any suitable means of wireless communication can be used. Wireless access point 52 can operate in connection with any wireless communications protocol, including 802.11a and 802.11b, as well as Bluetooth. Wireless access point 52 is further operative to allow access to resources operably connected to computer network 20. In one embodiment, wireless access point 52 is operative to convert all wireless traffic to Ethernet (or other LAN or network protocol) and route it to appropriate systems connected to computer network 20. Of course, the specific or optimal network protocols used in connection with the present invention may vary with the protocols implemented on LAN 20. In one embodiment, wireless access point 52 routes all wireless traffic from client devices 60 to a single location in the computer network embodiment (in one embodiment, a secure access server that authenticates users at client devices and controls access to resources connected to computer network 20). Co-pending and commonly owned U.S. application Ser. No. 10/271,106 filed Oct. 15, 2002 and entitled "Secure Wireless Network Access Points," (incorporated by reference herein), discloses methods and systems directed to securing wireless network access points. In one embodiment, wireless access point 52 includes tunneling functionality establishing and maintaining a virtual communications tunnel between access point 52 and the secure access server as disclosed in U.S. application Ser. No. 10/271,106, above. However, as one skilled in the art will recognize, the present invention can be applied in connection with a variety of secure and non-secure wireless network access point configurations. In one embodiment, at least one wireless network access point 52 includes scanning agent functionality operative to monitor its surrounding airspace for wireless traffic relative to at least one frequency channel, gather data characterizing detected wireless traffic, and transmit the data to airspace management platform 56 for processing and presentation to a network administrator. In WLAN environments employing 802.11 protocols, the wireless access point(s) 52 are equipped with 802.11-compliant WLAN network interface cards which support Radio Frequency (RF) monitoring mode, as well as the proper device drivers. In one embodiment, the wireless access point 52 includes an SNMP Management Information Base (MIB) for standards-based delivery of the scan data from the access point to the airspace management platform. In one embodiment, the scanning agent is a software daemon that is invoked when an SNMP SET request is received; the scanning agent operates to scan its airspace and transmit SNMP traps or populate its MIB characterizing the devices detected within its coverage area and then allows the wireless access point 52 to resume normal operation.

As discussed in more detail below, airspace management platform 56 facilitates management and overview of the wireless access point(s) 52 operably connected to computer network 20 and, in connection with one or more suitable wireless access point(s) 52, is operative to monitor the wireless network airspace associated with an administrative domain for wireless client devices and/or network access points, including known/authorized and/or rogue devices and access points. As discussed in more detail below, airspace management platform 56, in one embodiment, allows network administrators to schedule wireless access point (s) 52 to perform regular or intermittent scans, as well as start scans on-demand. Airspace management platform 56 is further operative to receive data from the network access point(s) 52, interpret the received data, and present it in a variety of interfaces to a network administrator to allow for intelligent, well-informed decision-making as to the computer network domain. In one embodiment, airspace management platform 56 is a Web-based application executed on a server or other computing device operably connected to computer network 20, and accessible via a client computer including suitable browsing software, such as Microsoft® Internet Explorer®, or Netscape® Navigator browsers. In another embodiment, airspace management platform 56 may reside on a desktop computer associated with a network administrator.

II. Operation

A. Registration and Management of Access Points

Using the airspace management platform 56, a network administrator registers at least one wireless access point 52 by entering or discovering information unique to the access point, such as BSSID or Wireless MAC address, LAN MAC address, and LAN IP address. As discussed below, BSSID or Wireless MAC address, LAN MAC address, and IP address are used as indexes in tables or other data structures that store information about each access point. Wireless access point(s) 52 that are registered with the airspace management platform 56 can then be used to scan for rogue access points and client devices, as discussed below. After registration, access points are authorized or brought under management of airspace management platform 56. The airspace management platform 56 can monitor the registered wireless access point(s) over computer network 20 via Simple Network Management Protocol (SNMP) read community string, and configure the wireless access point(s) 52 via SNMP read-write community string.

In one embodiment, airspace management platform 56 discovers the functionality and other parameters associated with registered wireless access points and populates a database (such as the tables, below) that includes information on each registered wireless access point 52. Airspace management platform 56, in one embodiment, supports a variety of Layer 2 discovery protocols such as CDP (Cisco Discovery Protocol), CDP (Cabletron Discovery Protocol, OSUNMS, and WNMS. Layer 2 discovery methods are suitable when airspace management platform 56 is on the same physical network as the access points 52. Higher layer discovery methods, such as SNMP and HTTP subnet scanning, are valuable for discovering wireless access points 52 on networks in which airspace management platform 56 is not physically located.

A.1. Access Point Master Table

As discussed above, airspace management platform 56 maintains a database storing information relating to the wireless access point(s) within the airspace associated with the computer network domain. In one embodiment, the database is a relational database comprising a plurality of tables, including a Master_AP table, an AP_Capabilities table, as well as other tables set forth below. In one embodiment, airspace management platform 56 creates a record in an AP_Master table including information gathered during the registration and discovery processes. The AP_Master table, in one embodiment, includes the following fields: 1) AP_Name (a user definable field of 32 characters), 2) Wireless Interface MAC address (Media Access Control, a 48-bit address generally displayed as 12 hexadecimal digits), 3) LAN Interface MAC Address, 4) LAN IP, 5) Service Set Identifier, 6) Type (i.e., Manufacturer and Product Name), 7) Firmware Version, 8) Channel, 9) Uptime, 10) Positional Parameters (e.g., Latitude and Longitude), and 11) a RogueScanFlag (indicating whether the wireless access point supports rogue access point scanning). Other fields can include: 12) Group Name (a user definable field indicating a grouping of access points for administrative purposes, see below), 13) status [up/down], 14) number of users, and 15) bandwidth.

The AP_Master table has several indexes which are employed in rogue access point detection. In one embodiment, the primary keys for the AP_Master table are: AP_Name, LAN Interface MAC Address (LAN_MAC), and Wireless Interface MAC Address (WLAN_MAC). Another field of importance to rogue access point detection in the AP_Master table is the RogueScanFlag. This flag is a Yes/No data type, where "Yes" indicates that the access point supports rogue AP scanning, and "No" indicates that the access point does not support rogue AP scanning. As discussed above, the database maintained by airspace management platform 56 contains an AP_Capabilities table relating AP manufacturer, model, and ability to support rogue scanning. When access points are registered and inserted into the AP_Master table the AP_Capabilities table is queried by manufacturer and model name to correctly set the RogueScanFlag in the AP_Master table.

Figure 3:
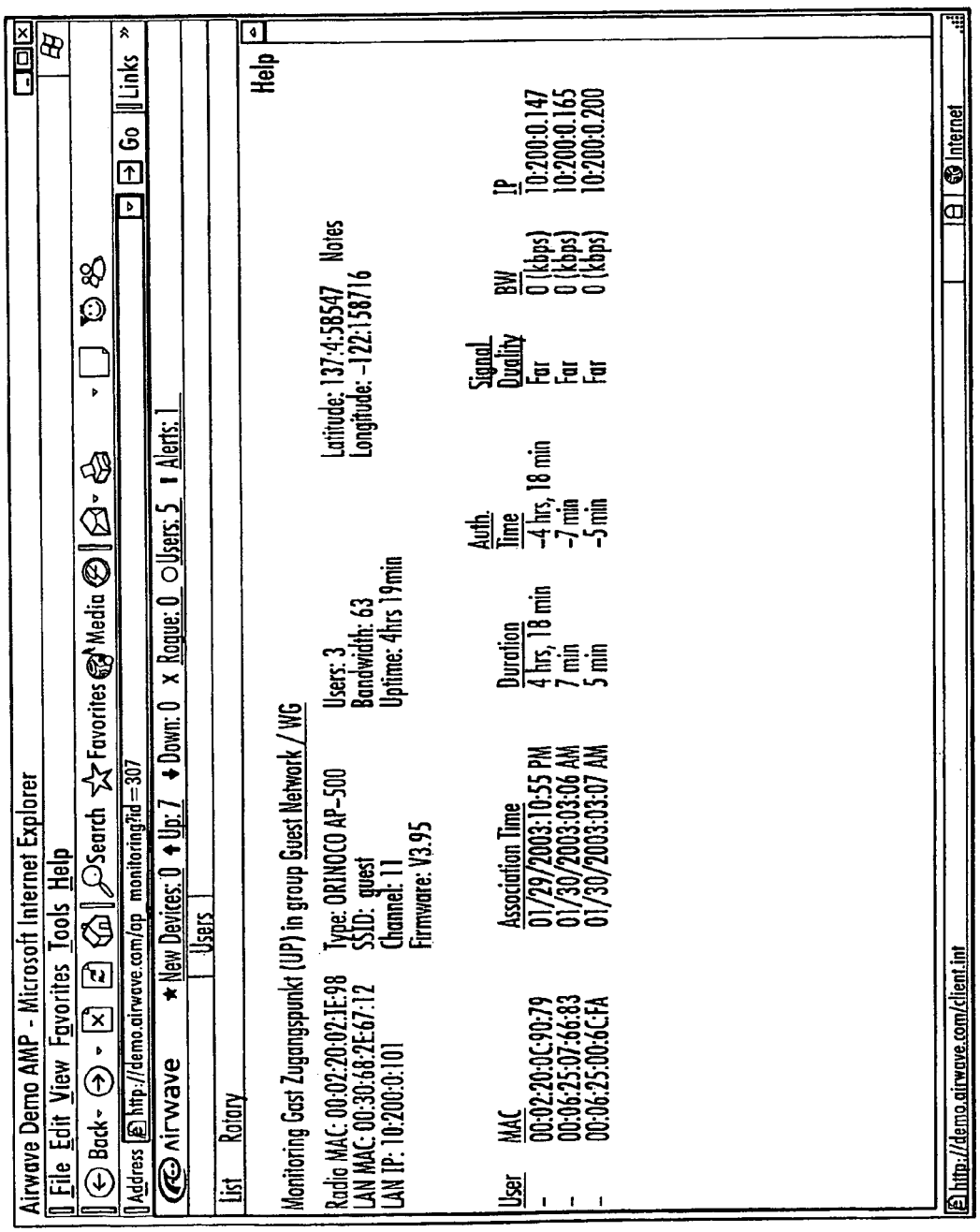
FIG. 3 sets forth a user interface providing detailed information associated with a given wireless access point.

As FIG. 2 illustrates, airspace management platform 56 provides an overview of the wireless access points, displaying, in one embodiment, a subset of the values or fields of the APMaster table to the network administrator. As FIG. 3 shows, airspace management platform 56 also allows the user to click on a particular access point in the interface depicted in FIG. 2 to see a detailed view of a desired wireless access point, such as the users currently associated with a wireless access point 52.

A.2. Administrative Groups

Figure 4:
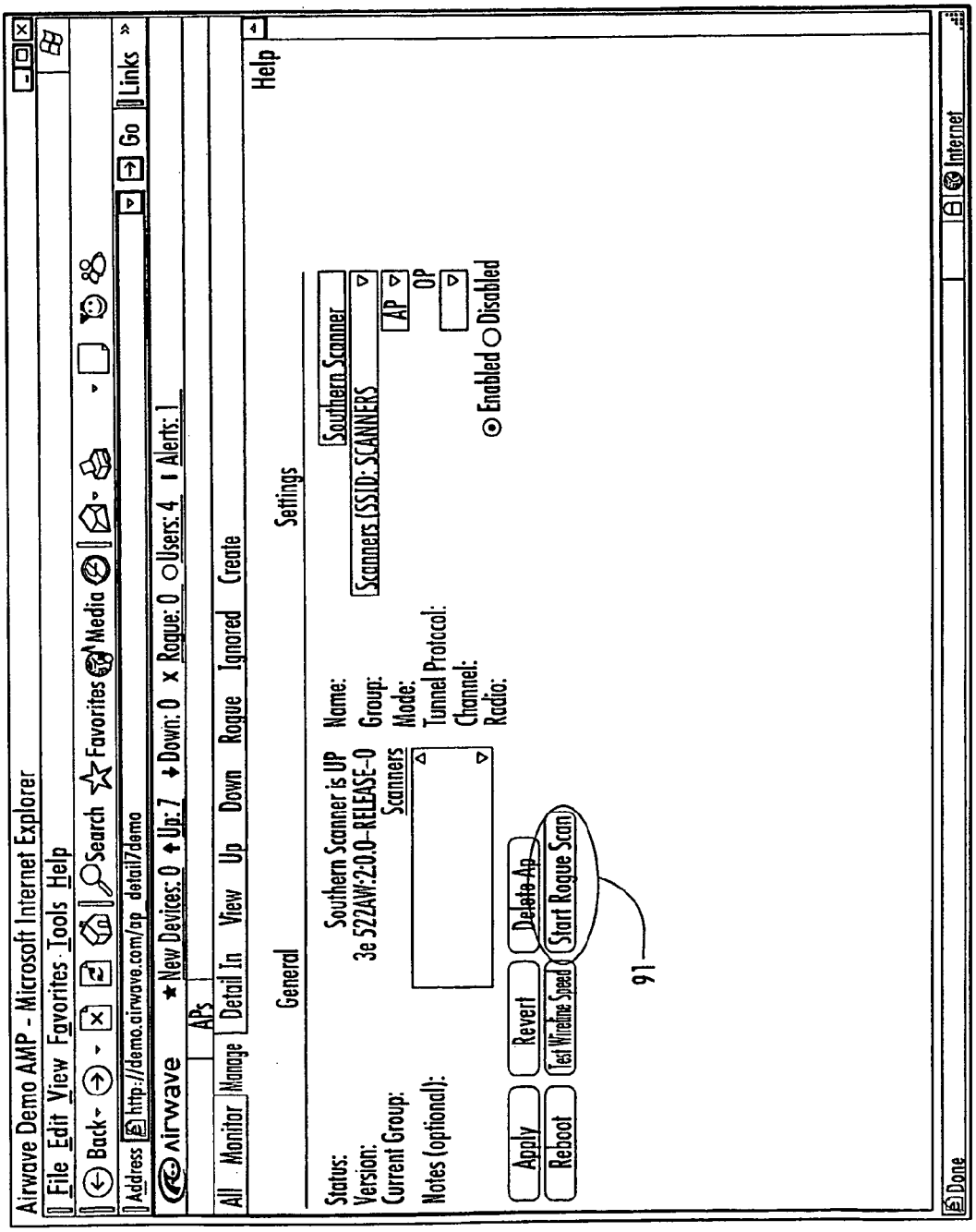
FIG. 4 provides a user interface that allows a user to initiate a scan at a given access point for rogue devices operating within its airspace.

Once registered, wireless access point(s) 52 are ready for inclusion in scans for rogue access points. As discussed above, airspace management platform 56 allows a network administrator to define two or more managed wireless access point(s) into groups for administrative purposes, such as applying configuration changes and the scheduling of rogue access point scans. Airspace management platform 56 allows a network administrator to initiate a scan at the access point level (see FIG. 4, button 91), or at the group level (see FIG. 5). In one embodiment, a "group" encompasses access points sharing similar security and radio characteristics. For example, in the WLAN set forth in FIG. 1, wireless access points named "Sales1" and "Sales2" are associated with a group defined by a network administrator. These wireless access points share the same SSID and security settings geared for the Sales department or "Sales Group" as defined in airspace management platform 56. Accordingly, in this example, the employees or other users associated with the sales department would configure their wireless client devices (WLAN network interface cards) to associate with access points having an SSID set to "Sales." In another embodiment, a group is arbitrarily defined by an administrator according to any desired criteria, such as location, department, etc. Groups can be used to simplify administration of a wireless LAN functionality, because configuration changes for a group can be entered once and automatically applied to all wireless access points associated with the group. In addition, groups provide a very efficient way of viewing or monitoring the wireless network. Executing a rogue AP scan by group enables a WLAN administrator to trigger scanning on all wireless access points in the) group that have scanning capability with minimal effort.

A.3. Scheduling of AP Scans

Figure 5:
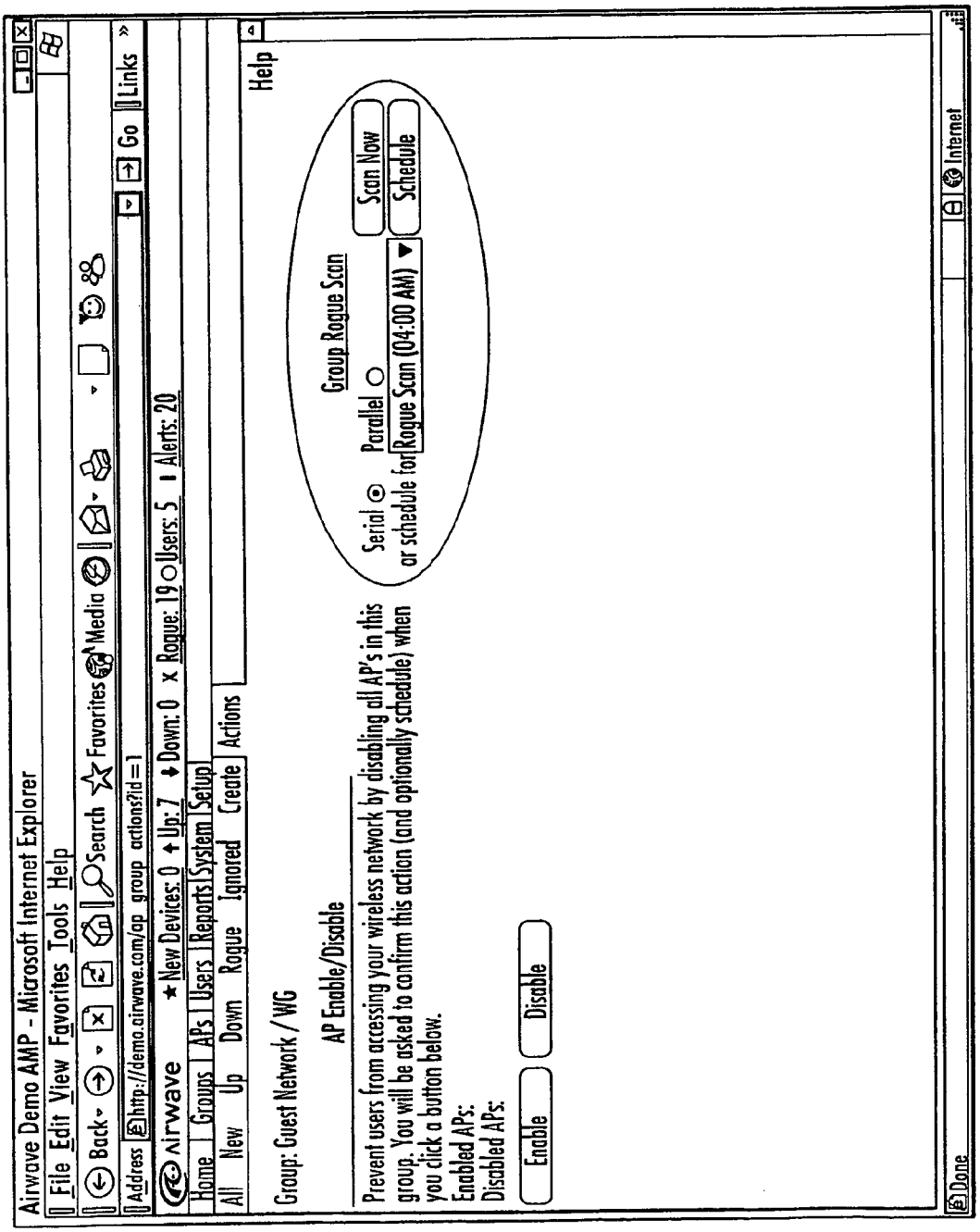
FIG. 5 illustrates a user interface allowing a network administrator to initiate a scan for rogue access points for a group of wireless access points.

As FIG. 5 illustrates, airspace management platform 56 permits the flexibility to scan immediately (on-demand) or schedule a rogue AP scan for a later time. Scheduling is a desirable feature as Rogue AP scans are obtrusive to the WLAN environment. Specifically, when a wireless access point 52 is configured to scan in RF promiscuous mode, it only listens or monitors for wireless traffic, because, given the collision avoidance mechanisms associated with the 802.11 protocols, transmitting data may prevent any incoming traffic it was trying to collect. As one skilled in the art will recognize, other wireless networking protocols may allow wireless access points to simultaneously operate in RF promiscuous mode and access point mode. Accordingly, during a scan, wireless client devices 60 are disconnected from the scanning wireless access point 52 and, therefore, have no connectivity to LAN 20. Scheduling Rogue AP scans at night or on the weekend reduces the opportunities that wireless client devices 60 experience a loss of network connectivity. As FIG. 5 illustrates, airspace management platform 56 also supports both serial and parallel methods of executing the scan within a group as to both scheduled scans and on-demand scans. Serial scanning enables a well designed wireless LAN to maintain wireless client connectivity, because only a single wireless access point 52 scans at any given time. When an access point is off-line for scanning, the wireless clients can immediately associate, without loss of connectivity, to an adjacent wireless access point 52, if any, with the same SSID or within the same ESS (Extended Service Set).

After rogue AP scanning parameters are entered, airspace management platform 56, in one embodiment, builds a job schedule. In one embodiment, all tasks are executed as jobs via the scheduler whether the job is scheduled for a later time or immediate/on-demand. In one embodiment, a task comprises a scan by a single wireless access point 52; accordingly, a requested group scan may yield a plurality of jobs in the job scheduler. In one embodiment, when the job scheduler executes a job, it constructs an SNMP SET request and transmits it to the wireless access point 52 associated with the job. For example, in embodiments where wireless access point(s) 52 support(s) the SNMP MIB set forth in Appendix A, the job scheduler executes a SNMP SET request for Object Identifier (OID) (1.3.6.1.4.12028.4.3.4 BeginRogueAPScan) which, in one embodiment, passes the following value sets: {(packetsToCollect type-integer, value), (secsToWaitPerChan type-integer, value), (channelBeginScan, type-integer, value), (channelEndScan, type-integer, value), (channelToSkip, type-integer, value), and (numberofIterations, type-integer, value)} [see Appendix A]. In one embodiment, airspace management platform 56 waits for a configurable number of seconds after the SNMP SET request to receive all device scan traps (scanDataRow) and the end of scan trap (endRogueScan) from the scanning access point 52. If no traps are received, airspace management platform 56 transmits another SNMP SET request. If no traps are received after a threshold number of SET requests, airspace management platform 56 reports a fault condition to the network administrator.

B. Scanning Wireless Airspace

After receiving the SNMP-SET request from airspace management platform 56, the wireless access point 52 invokes a locally executed scanning agent which moves its WLAN Network Interface Card (NIC) card from BSS master mode or normal AP mode, to a promiscuous RF monitoring mode. Many WLAN network interface cards installed on currently available wireless access points include promiscuous monitoring functionality, such as PrismII cards in LinkSys®, D-Link®, Compaq®, and Cisco® wireless access points. Promiscuous monitoring mode is a process that has analogy on the wired or wire line medium. On a wired network most Ethernet cards filter traffic so that only traffic destined for that card (installed in a PC or other network device) is received into higher layers of the operating system. Placing the LAN NIC card into "promiscuous mode" causes the LAN NIC to pass all traffic seen on the wire to higher layers in the operating system. On a non-switched or hub network, a computer or network device with its network card in promiscuous mode can listen to all traffic on the network segment. Similarly, in 802.11 or other wireless networks, the WLAN NIC, operating in its normal mode, only sends data packets destined for the device or management packets for Basic Service Set to higher layers in the operating system. In 802.11 wireless networks, wireless NICs, operating in a normal mode, only send packets within the same BSS and the same SSID to higher layers of the operating system. RF promiscuous mode, however, enables the wireless NIC to sniff all traffic in the surrounding airspace (radio coverage area and relative to one to a plurality of channels) regardless of network association.

FIG. 6 illustrates a method, according to an embodiment of the present invention, directed to scanning for rogue access points. When a designated wireless access point 52 receives an SNMP SET request (above) (102), a scanning agent changes the configuration of wireless access point 52 to operate in promiscuous RF monitoring mode (104). Once in this mode, the scanning agent executing within access point 52 uses the variables passed within the SNMP SET request to OID "beginRogueScan" to execute the properly formulated scan. Specifically, the scanning agent begins listening on the channel defined in the "channelBeginScan" variable (106). The scanning agent monitors this channel for packets and analyzes detected packets in order to build a memory array including data corresponding to detected wireless client devices and access points (114). In one embodiment, while a variety of packet types may be present, the scanning agent is configured to process only data packets and management-beacon packets to build the memory array of wireless devices, as discussed below. As FIG. 6 illustrates, the scanning agent listens on the current channel until it collects the number of packets defined in variable "packetsToCollect" (110) or until the channel timer has expired defined in variable "secsToWaitPerChan" (112). Next the scanning agent proceeds to the next channel (current channel+SNMP variable "channelToSkip") (116) until the next channel is greater than SNMP variable "channelEndScan" (108).

Figure 7A:
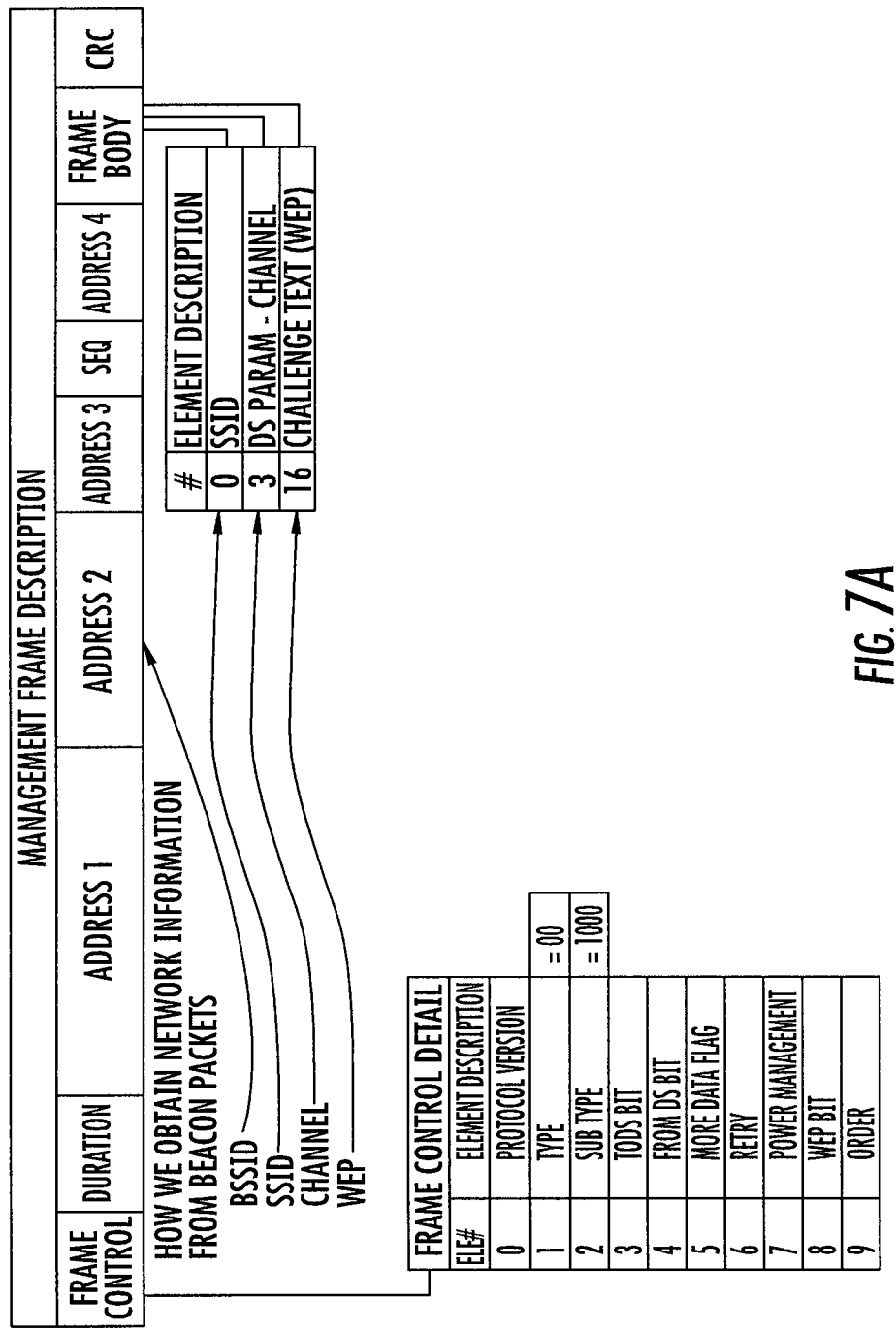
FIG. 7A illustrates the layout of management frames or packets in 802.11 networks and the mapping of information in the frames.
Figure 7B:
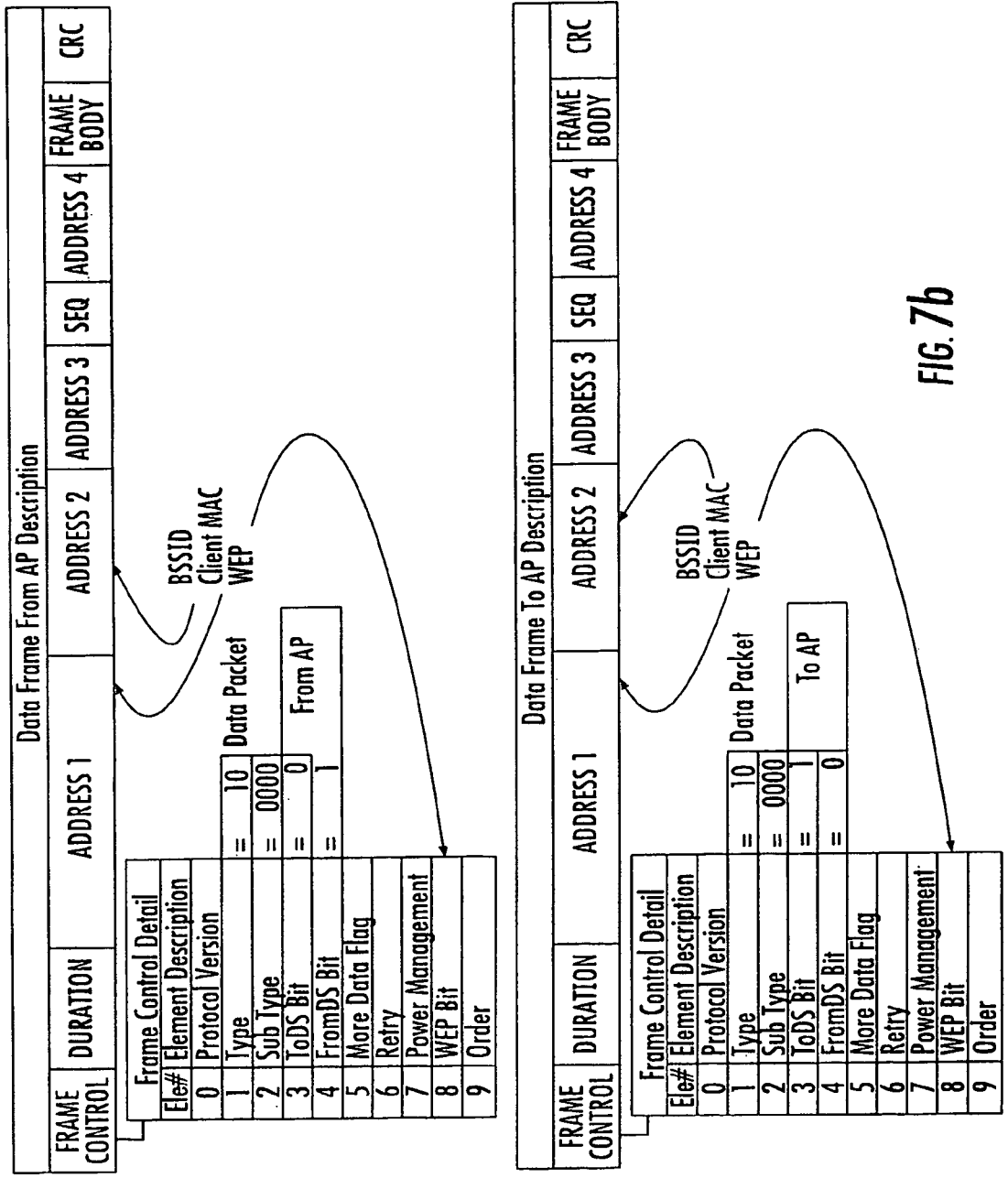
FIG. 7B provides the layout of data frames or packets in 802.11 networks.

FIGS. 7A (management) and 7B (data) set forth the frame layout according to the 802.11 specification and illustrates how the scanning agent analyzes the data packets gathered while in the promiscuous monitoring mode to populate a memory array. FIG. 7A illustrates the frame layout of a management packet, such as a beacon packet transmitted by an access point. As FIGS. 7A and 7B illustrate, packet type (e.g., data v. beacon) in the 802.11 standard can be determined by examining the values of the frame control bits. FIG. 7A illustrates how the scanning agent can detect various fields such as BSSID, SSID, Channel and the like. Furthermore, FIG. 7B illustrates the frame layouts of data packets transmitted from (top layout) and to (bottom layout) a wireless access point. As FIG. 7B illustrates, the direction of data packets can be determined by evaluation of the values of the frame control bits. With the direction, the scanning agent can resolve whether the first address (address 1) or the second address (address 2) corresponds to the access point (BSSID). The RSSI (relative signal strength) is provided by a physical layer header called PrismII monitor header that is not a part of 802.11 frame header, but is generated by the firmware of the receiving card. One skilled in the art will recognize that other wireless protocol standards feature different frame layouts and will be able to configure the scanning agent to parse the various data fields in the packet or frame headers.

In addition, FIG. 8 illustrates a memory array (top table) including data obtained during a hypothetical scan for didactic purposes. For example, the first row of the memory array indicates that, on channel 1, the scanning access point detected a data packet transmitted from/to a wireless client (see Type field) associated with an access point having a WLAN MAC address or BSSID of 00:02:2D:03:4C:B0. Further, the second row indicates that the scanning access point also detected a data packet from the same client on channel 2. As one of skill in the art will recognize, the channels defined in the 802.11 specification only include 3 non-overlapping channels (1, 6 and 11) among the total number of channels. As one of skill in the art understands, the channel represents the center frequency that the transceiver within the radio and access point uses (e.g., 2.412 GHz for channel 1 and 2.417 GHz for channel 2). There is only 5 MHz separation between the center frequencies. Furthermore, an 802.11b signal occupies approximately 30 MHz of the frequency spectrum. The signal falls within about 15 MHz of each side of the center frequency. As a result, an 802.11b signal overlaps with several adjacent channel frequencies. This leaves only three channels (channels 1, 6, and 11 for the U.S.) that can be used without causing interference between access points. Accordingly, a scanning access point is likely to detect data packets from a given wireless client or access point on more than one channel. For example, scanning on channels 3 and 4, the scanning access point 52, in the didactic hypothetical, detected beacon packets from an access point having a MAC address of 00:02:2D:03:4C:B0 and configured with an SSID of "AirPort Network." As FIG. 8 shows, the scanning access point detected no wireless traffic on channel 8 during the scan.

As FIG. 6 further illustrates, after the scan and memory array construction, the scanning agent analyzes the memory array (118) and sends back a summarized set of traps to airspace management platform 56 (120). The table illustrated in FIG. 8 and entitled "Post Analysis Data Sent via SNMP to AMP from Scanning AP" illustrates the scanDataRow traps (each row corresponding to a trap). In one embodiment, the scanning agent resolves discrepancies such as the channels on which packets were detected in creating the scanDataRow traps. See also Appendix A ("scanDataRow"). As FIG. 8 illustrates, the scanning agent logically assigned the closest usable (non-overlapping) channel to the networks implemented by access points "00:03:2F:00:12:AE" and "00:02:2D:0D:4D:7C". Also notice the Access Point "00:02:2D:03:4C:B0" is summarized into a single trap event though it was heard on channel 3 and channel 4. Because 802.11-compliant beacon frames identify the transmitting channel, the scanning agent assumes that the channel identified in the beacon packet (here, channel 1) is correct and that the data packet detected during the scan on channel 4 bleed-over from channel 1. In the example illustrated in FIG. 8, at the end of the analysis, the scanning access point 52 would transmit to airspace management platform 56 four "scanDataRow" SNMP traps and one "endRogueAP" SNMP traps (signaling the end of the scan and indicating the number of scanDataRow traps sent).

As one skilled in the art will recognize, the scanning agent described above does not distinguish between registered/authorized wireless devices and rogue or non-registered devices. Rather, as discussed above, the data generated during the scan is summarized and sent as SNMP traps to airspace management platform 56, which processes the traps (as discussed more fully below) to detect the present of rogue access points and/or wireless clients. One skilled in the art will recognize, however, that this division of functionality is not required by any constraint, and that the scanning agent executed by the access point(s) 52 can be configured to detect for the presence of rogue access points and transmit corresponding SNMP traps to airspace management platform 56. A preferred embodiment, however, is the example described herein where the scanning agent running on the access point only collects data characterizing detected wireless traffic and transmits this collected data or summarized versions to airspace management platform 56 for further analysis. Airspace management platform 56, according to a preferred embodiment, performs the analysis of the data, functioning as the SNMP manager while the access point functions as the agent in accordance with the principal foundations of the SNMP framework.

B.1. Identification of Access Points from SNMP Trap Data

Airspace management platform 56 receives the scanDataRow traps and processes them to identify rogue wireless devices. In one embodiment, each scanDataRow trap is processed against the information contained in one to a plurality of tables to identify rogue wireless devices operating within the airspace associated with the wireless network environment. In one embodiment, airspace management platform 56 maintains three categories of wireless devices: 1) authorized, 2) rogue, and 3) ignored. Authorized wireless access points are generally business grade access points (e.g. manufactured by Cisco, Lucent, Symbol, etc.) that have been authorized by the enterprise/network administrator and registered with airspace management platform 56 (see above). As discussed above, information relating to authorized access points is contained in the AP_Master table. As discussed more fully below, airspace management platform 56, in one embodiment, also maintains a Rogue_Master table and an Ignored_Master table. An authorized wireless client or wireless station associates to an authorized access point and also possesses valid authentication credentials granted by a central security system. Rogue wireless devices encompass any wireless device (client or access point) in the enterprise's airspace that is not registered as an authorized or ignored device, as indexed by WLAN MAC address in the appropriate tables within the airspace management platform 56. The ignored category represents wireless devices that have been processed through the rogue detection process set forth herein, reported to the network administrator and configured by the administrator in the Ignored category. An example would be an access point from a neighboring business. The access point is not rogue, but is nevertheless worthy of attention and is generally ignored until a change associated with the access point is detected.

Figure 9:
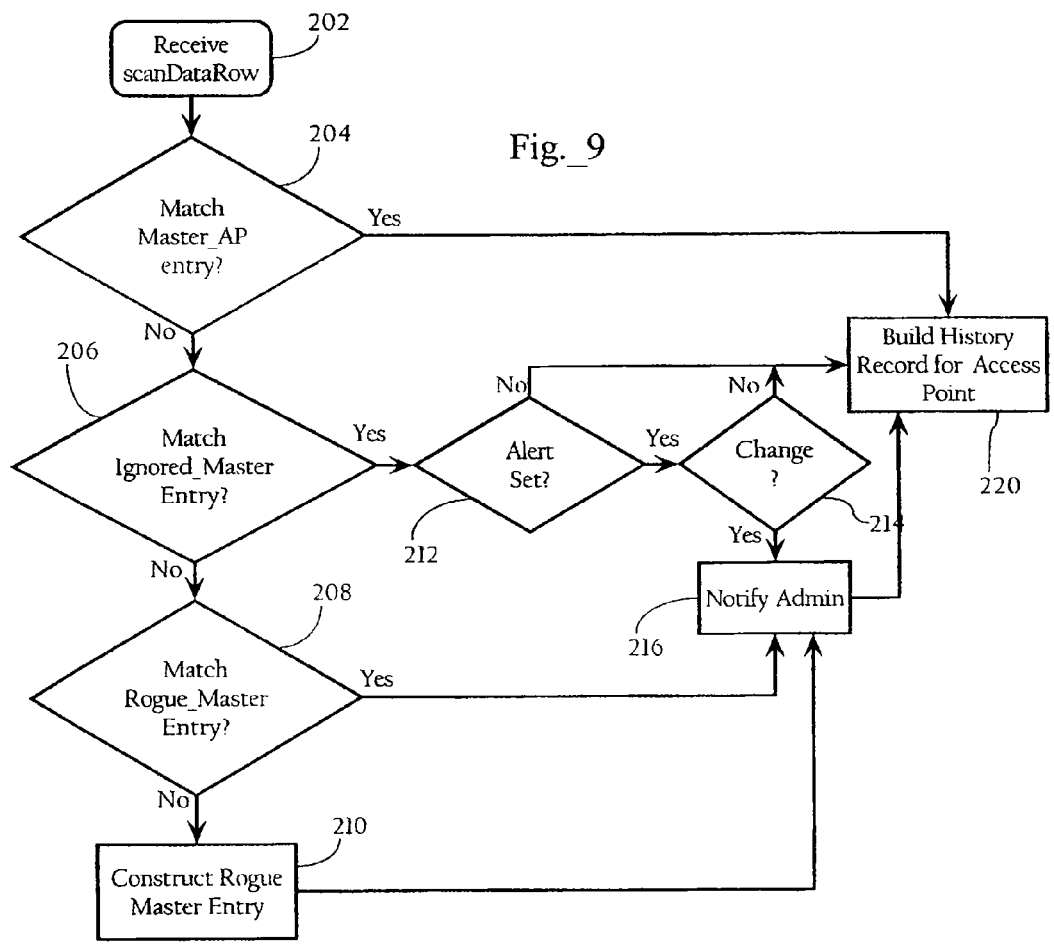
FIG. 9 is a flow chart illustrating a method OF processing SNMP traps transmitted by scanning access points.

Against this exemplary backdrop, each "scanDataRow" trap is processed in the following manner. Airspace management platform 56, in one embodiment, evaluates the "awAPReturnBSSID" against the three categories of wireless devices (authorized, ignored and rogue) in the Master, Ignored and Rogue AP tables. FIG. 9 sets forth a method for processing scanDataRow traps according to an embodiment of the present invention. In one embodiment, airspace management platform 56 first queries the AP_Master table, searching for matches between the awAPReturnBSSID and the WLAN MACs of the AP records in that table (204). If there is a match, airspace management platform 56 builds a history record for the AP (220), showing that it was scanned by the AP defined in the value "awAPScanID" or LAN MAC address.

If there is not a match between the "awAPReturnBSSID" and the WLAN MACs of the AP_Master table records, then airspace management platform 56 determines whether the "awAPReturnBSSID" matches any records contained in the Rogue_Master (208) and Ignored_Master (206) tables. If the awAPReturnBSSID matches an entry in either table, airspace management platform 56 builds a history record for the matching access point as discussed above. If there is not a match in either the Rogue_Master or IgnoredMaster tables, then the airspace management platform 56 creates a Rogue_Master record with an index using the WLAN MAC or "awAPReturnBSSID" (210). As FIG. 9 shows, airspace management platform 56 also builds a history record for the Rogue AP (220), showing that it was scanned by the AP defined in the value "awAPScanID" or the LAN MAC address.

In one embodiment, history records are maintained in a history table indexed by WLAN MAC address and further contain the remaining data elements contained in the scanDataRow trap. By building these relationships, airspace management platform 56 can analyze these history records to determine which authorized access points are contiguous, on what channel these APs are broadcasting, and the relative signal strength of their transmissions. Utilizing this information, airspace management platform 56 can automatically configure (or the network administrator can manually configure) the transmission power level and channel for optimum performance in light of the surrounding access points. For 802.11b as regulated in the United States in particular, there are only 3 non-overlapping channels (1, 6, and 11), so this high-level logic is extremely valuable and can be used to ensure that contiguous access points (those with overlapping airspaces) are configured to broadcast on non-overlapping channels. In a multi-floor environment a third dimension of height or floor level is added. Airspace management 56 seamlessly learns and links all access points by contiguous airspace by determining which access points can sense each other. As discussed above, the AP_Master record also stores the positional (e.g., GPS) coordinates associated with each wireless access point 52, allowing a true 3-dimensional depiction of a WLAN environment. Currently produced access points do not generally contain GPS receivers, accordingly, the information recorded in the database is only as accurate as a human translating the GPS reading from a handheld device at the location of the access point, and inputting the information into the database of airspace management platform 56. As one skilled in the art will recognize, the integration of GPS receivers into wireless network access points and corresponding MIB extensions to expose the GPS coordinates computed by the receiver can be readily accomplished. Accordingly, future embodiments of airspace management platform 56 also contemplate querying access points via SNMP or similar protocols for GPS coordinates. Even without GPS coordinates, airspace management platform 56 is still able to produce a 2-dimensional representation of the airspace associated with an administrative domain, mapping out contiguous access points.

B.2. Notifications

In one embodiment, an aspect of airspace management platform 56 is operative to provide notifications upon the detection of certain events (e.g., detection of a rogue access point, changes to ignored devices, changes/degradation of network performance characteristics, etc.). All data from access points, clients, security repositories, and network infrastructure is monitored on a real-time or near-real-time basis. Airspace management platform 56 further allows network administrators to define triggers when one or more collected data values exceed a threshold. Triggers cause an alert action to take place when the threshold is exceeded. Rogue access points, in one embodiment, fall under the security category. In one embodiment, there is a specific system trigger entitled "New Rogue AP Discovered" where a network administrator can define how he/she wants to receive immediate communication about the presence of a rogue device in the airspace. The three avenues for communication, in one embodiment, are email (address or distribution list), log (message is written into a syslog), and NMS (a trap is sent to a Network Management System like HP OpenView).

FIG. 9 illustrates that, in one embodiment, airspace management platform 56 issues a notification in response to the detection of rogue access points and/or changes to ignored access points. As described above, wireless devices discovered during a wireless scan of the airspace are categorized depending on airspace management platform 56 system settings (e.g., the state of the AP_Master and other tables) as Authorized, Ignored or Rogue. Specifically, as FIG. 9 shows, when airspace management platform 56 categorizes a wireless device as a rogue device (208,210), it issues a notification (216). Similarly, detected changes to an Ignored device (214) can also cause airspace management platform 56 to issue a notification. In one embodiment, the ignored_Master table contains a flag "AlertOnChange". If this flag is set (212), airspace management platform 56, in one embodiment, compares the channel, SSID, and WEP of the Ignored access point in the Ignored Master Table to the information received in the scanDataRow trap.

The Ignored device category, in one embodiment, can be used for access points that are not rogue access points connected to an enterprise's local area computer network, but for those access points that nevertheless overlap with the airspace associated with the enterprise's administrative domain. For example, this could be a legitimate, physically-adjacent enterprise's access point beyond the network administrator's control, but still worthy of monitoring. For example, the network administrator having knowledge of such an access point can engineer his network so that the access points 52 that overlap the airspace with the neighboring access point are operating on a different channel and SSID. The "AlertOnChange" flag, in one embodiment, indicates to airspace management platform 56 only to notify the network administrator when this Ignored device changes channel, SSID, or location, as these settings and the access point's location could impact the performance of the enterprise's wireless network. When the "AlertOnChange" flag is set airspace management platform 56 looks at the trigger definition of "Ignored AP Alert on Change" and sends the appropriate notifications. As one skilled in the art will recognize, the detection of a new/unknown wireless device, according to the embodiments described above, will never directly create an entry into the Ignored_Master table. Rather, as FIG. 9 illustrates, the detection of an unknown wireless device creates a new entry into the Rogue_Master table and is reported to a network administrator. The network administrator can then decide whether to place the discovered wireless device in the Ignored category and, therefore, the Ignored_Master table.

Figure 11:
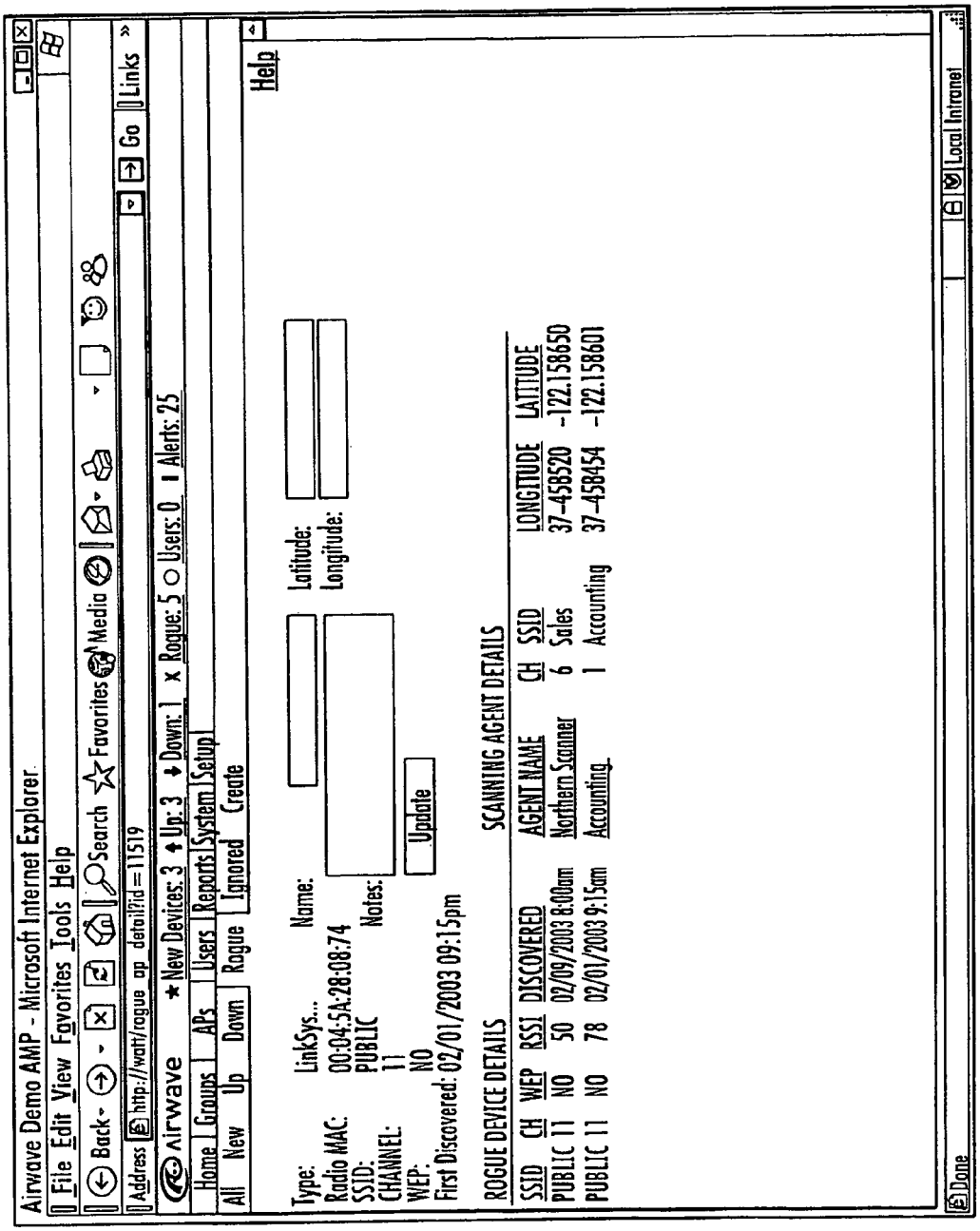
FIG. 11 illustrates a user interface showing a detail view of a given rogue access point detected during a scan.

In one embodiment, airspace management platform 56 allows network administrators to configure a "New Rogue AP Discovered" trigger defining how notifications are issued. Depending on the definition of "New Rogue AP Discovered" trigger, airspace management platform 56, in one embodiment, creates a notification or notifications containing the following information: 1) LAN MAC and AP Name of discovering access point, 2) date and time the scan was initiated, 3) the duration of the scan, 4) the WLAN MAC of the Rogue device, 5) the SSID of the WLAN device, 6) the channel of the Rogue device, and 7) potentially the Client Radio MAC address. Included in each of these notifications, according to one embodiment, are URL links back to the Rogue Event, Discovering access point, and Rogue device. The URL link enables recipient network administrators immediate access over a computer network to resolve the rogue problem. FIG. 11 illustrates a user interface, according to an embodiment of the present invention, detailing the information characterizing a detected rogue access point.

C. Isolation of Rogue Access Points

Figure 10:
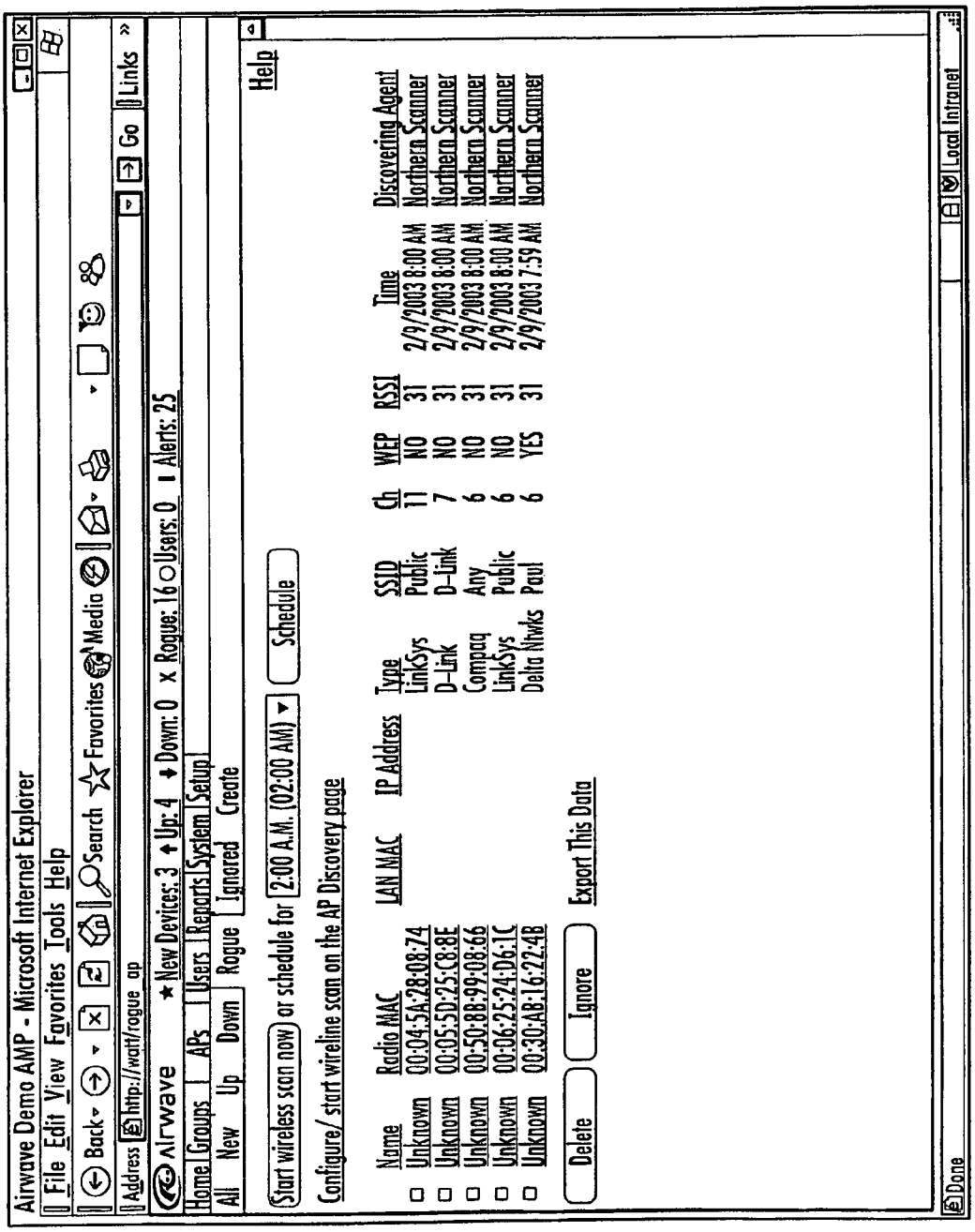
FIG. 10 illustrates a user interface showing a list of detected rogue access points.

Once the scan or scans are complete and all scanDataRow traps are processed, airspace management platform 56 is operative to display information characterizing the state of the enterprise's airspace. FIG. 10 shows a user interface displaying a list of rogue devices detected during a scan. This page allows WLAN administrators to view all Rogue access points discovered in the scan and take appropriate action with respect to them. As FIG. 10 illustrates, airspace management platform 56, in one embodiment, summarizes the rogue device information and sorts them by discovered date and time. From this interface, a network administrator can identify the number of rogue devices in the airspace that require further attention. In one embodiment, airspace management platform 56 includes an OUI database, which is an Organizationally Unique Identifier or a 24 bit globally unique assigned number from IEEE. This database allows airspace management platform 56 to match the first three octets of the Rogue WLAN MAC address back to the original manufacturer. In one embodiment, airspace management platform 56 includes an extended OUI database that incorporates model numbers to the $4^{th}$ and $5^{th}$ octets and cross referenced wireless manufacturer OUIs to their resale entities. As FIG. 10 shows, additional columns from this view include AP Name, SSID, Channel, WEP, RSSI, Discovery Date and Time, and Discovery Agent or AP. As FIG. 10 shows, the AP Name is blank unless and until the network administrator configures a name for it.

The SSID column allows the network administrator to quickly ensure that the detected rogue access point is not conflicting with a SSID of an authorized access point within the airspace associated with the enterprise's wireless LAN as it could hijack legitimate users associated with the conflicting authorized access point. The channel field is self explanatory, but plays an additional role in the Rogue Detail View. The WEP column allows an administrator to determine how large a security breach the access point really is. If WEP is disabled then the access point could potentially be bridging the enterprise LAN to any person within the access point's radio coverage cell. The Relative Signal Strength (RSSI) column represents the signal strength identified from the discovering access point to the rogue device.

FIG. 11 sets forth a user interface providing a detailed view of information relating to a given rogue access point detected during the scan. To continue the process of examining the rogue device, an administrator may drill into the detail view by double clicking the MAC or the AP Name in the interface of FIG. 10. If the AP Name is not known it will display "Unknown". The user interface provides a network administrator the opportunity to name the detected device. The table has indexes on the WLAN MAC and the LAN MAC of the rogue device so duplicate or blank AP names do not breach the integrity of the database. In the detail view the administrator has the ability to update the AP Name, GPS coordinates, and notes regarding the access point. The first pass at this view can be utilized to find all access points that were detected within the airspace(s) of the scanning access point(s) 52. Either utilizing GPS or basic triangulation a network administrator with the information provided by airspace management platform 56 has a good estimate of the location of the rogue access point. The relative signal strength indicator value adds some granularity to the potential location of the device as a small RSSI value relative to one scanning access point indicates that it may be further away, while a RSSI value indicates that it may be closer to the scanning access point.

The administrator now can proceed to the approximate location of the detected rogue access point with a GPS Receiver and wireless scanning tool. When the access point is located, the network administrator can physically disable the access point (for access points located on the wired network), note location (for access points not connected to the wired network), or take any other appropriate action. Using the airspace management platform 56, the network administrator can update as much information gathered about the rogue access point by assigning a Name and notes about whom and how the access point was installed. For example, the rogue device could be an access point from a neighboring business. In this instance the name and notes fields would reflect this information. After updating the data, the network administrator can delete the record corresponding to the rogue access point, leave it in the rogue category, or place it in the authorized category (if rogue detection is being used to discover new and authorized devices) or the ignored category. Ignoring or deleting the rogue device completes the isolation process work flow for the selected rogue device. The administrator can then continue working on analyzing the remaining devices on the list until all rogue devices are isolated.

The following provides a didactic example illustrating application of the present invention. One example of this scenario would be where a first business installs a wireless network at a remote facility. Subsequently, an adjacent entity decides to install a WLAN in its small office. This access point is not a rogue as it is not installed on the enterprise's network, but the enterprise would nevertheless want to know about it. The first time a Rogue Scan is run on the access point for that particular remote facility, the discovered access point associated with the adjacent business would be detected and Recorded as a rogue device. The network administrator would be very interested in determining whether the rogue device runs on the same or overlapping frequency channels of authorized access points that detected the rogue device during the scan. This would aid the administrator in adjusting the configuration of, and optimizing the performance of, the enterprise's wireless network. The network administrator would also want to ensure that the adjacent access point is not configured with the same SSID. The network administrator may also desire to know whether WEP was enabled on the adjacent access point as any wireless client may associate to the rogue access point that does not have WEP enabled instead of the desired enterprise access point. Using airspace management platform 56, the network administrator could quickly run a report to show usage patterns for the days preceding detection of the rogue device. If the number of users and wireless traffic has declined significantly, then the network administrator could travel to the remote location to determine the best means of resolution. If the user and traffic numbers have not declined, the network administrator could simply move the detected access point to the ignored classification with "alert on change" set. As the example illustrates, the present invention reduces the cost of monitoring the WLAN by (1) minimizing the time and resources required to roam throughout the enterprise with a laptop sniffing for rogue access points and users, by (2) allowing an enterprise to leverage a single device, or multiple devices, to function as an access point and air scanner, and (3) by centrally managing all access points from a single console.

Another embodiment of this present invention, discloses a method and system for detecting all interfaces, LAN MAC addresses and radio MAC addresses (BSSIDs), affiliated with a rogue device operating in a hybrid network. Once detected, this information can be compiled into a database in order to reduce the number of alerts that one rogue device can generate and to increase the accuracy and speed of locating the rogue device within the network.

Figure 12A:
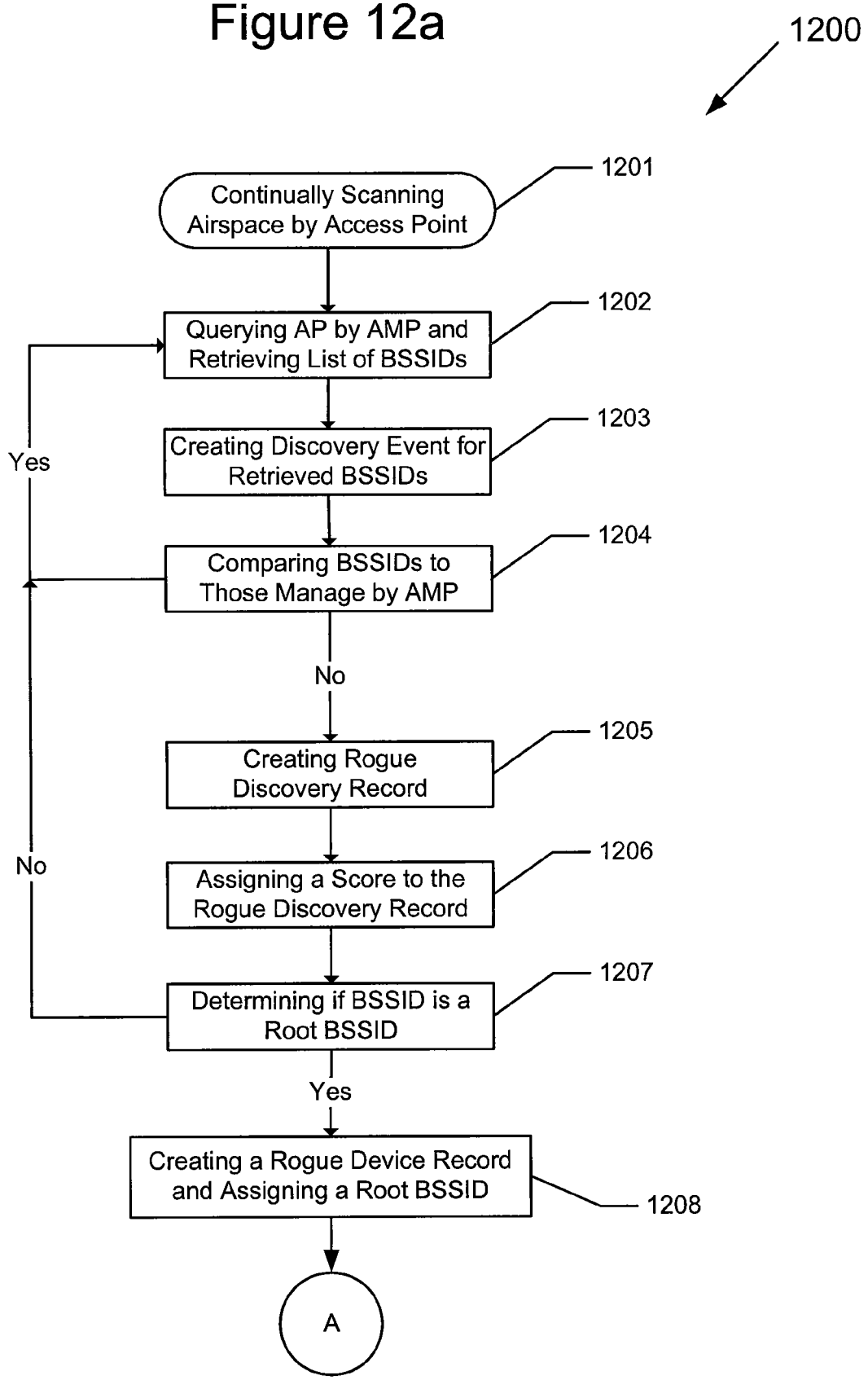
FIGS. 12a and 12b illustrate a flow chart for a method of scanning for rogue devices, gathering data, analyzing the data gathered, and building a master device record.

FIG. 12a illustrate a flow chart diagram for a method according to an exemplary embodiment of the present invention. In particular, the method is directed to the scanning for rogue devices (over-the-air and on-the-wire), gathering data of the detected rogue devices, analyzing the data gathered, and building a master device record which relates all of interfaces detail records.

Initially, at step 1201, an access point (AP) scans its airspace and retrieves a list of BSSIDs from radios communicating within the reception range of the access point. This scanning occurs continuously to provide up-to-date information about neighboring wireless devices. At step 1202, an AirWave Management Platform (AMP) queries the AP via SNMP and to retrieve the list of BSSIDs detected by that access point.

Next at step 1203, the AMP creates a discovery event for all BSSIDs returned from the access point. The discovery event will include information relating to the detected device such as signal strength, BSSID, security and channel. Creating a discovery event for each BSSID enables the AMP to map the RF environment and locate the particular rogue device via triangulation and/or other location methods. Subsequently, at step 1204, the AMP compares the detected BSSIDs to a list of BSSIDs (radios) currently under the AMP's management. If the BSSID is managed by the AMP, the AMP will recognize that the device is inherently not a rogue device, and, therefore, poses no security risk. Accordingly, the AMP reverts to step 1202. Alternatively, if the BSSID is not managed by the AMP (i.e., it is not part of the existing list), then it is potentially a rogues device and a rogue discovery record (over-the-air) is therefore created (step 1205).

In one embodiment of the method, a score that indicates the level of security risk may be assigned to the BSSID by AMP at step 1206. For example, higher scores may indicate a greater security risk with "7" being the highest score that can be assigned to a rogue device. In one embodiment, the score is preferably assigned to the BSSID using the following scheme: (1) any MAC address on the wired network; (2) a MAC on the wired network whose OUI belongs to a company that manufacturers wireless devices; (3) a MAC on the wired network whose OUI contains enterprise wireless access points; (4) a MAC on the wired network whose OUI contains SOHO wireless access points; (5) a MAC on the wired network that has an associated IP and an embedded operating system (e.g., VxWorkS™ or Linux™); (6) a BSSID or multiple BSSIDs that belongs to a device that was only detected over-the-air; and (7) a rogue device detected over-the-air that is also on the monitored wired network. It should be understood that a rogue device that is not on the wired network (security risk score of "6") can cause interference problems, but a rogue device that is in the airspace and actually on the monitored wired network (security risk score of "7") may pose a significantly higher security risk since it potentially has access to a great deal of sensitive data.

Referring back to FIG. 12a, once the score is assigned to the BSSID, the AMP continuously evaluates all rogue discovery records searching for a root BSSID (step 1207). The root BSSID, also referred to as a "burned-in addresses" (BIA), is a unique address assigned to a device by its manufacturer. The first three octets identify the organization that issued the identifier (i.e., the OUI) and the following three octets (MAC-48 and EUI-48) or five octets (EUI-64) are assigned by that organization in a discretionary manner. Generally, the root BSSID is stored in a very small EEPROM during final board assembly for the device.

If the AMP does not identify a new root BSSID from the rogue discovery records at step 1207, then the AMP queries the AP or controller via SNMP again in order to retrieve the updated list of BSSIDs as illustrated in step 1202. Alternatively, if a root BSSID is identified, the AMP creates a rogue device record and assigns the root BSSID from the rogue discovery record to the rogue device record (step 1208).

Figure 12B:
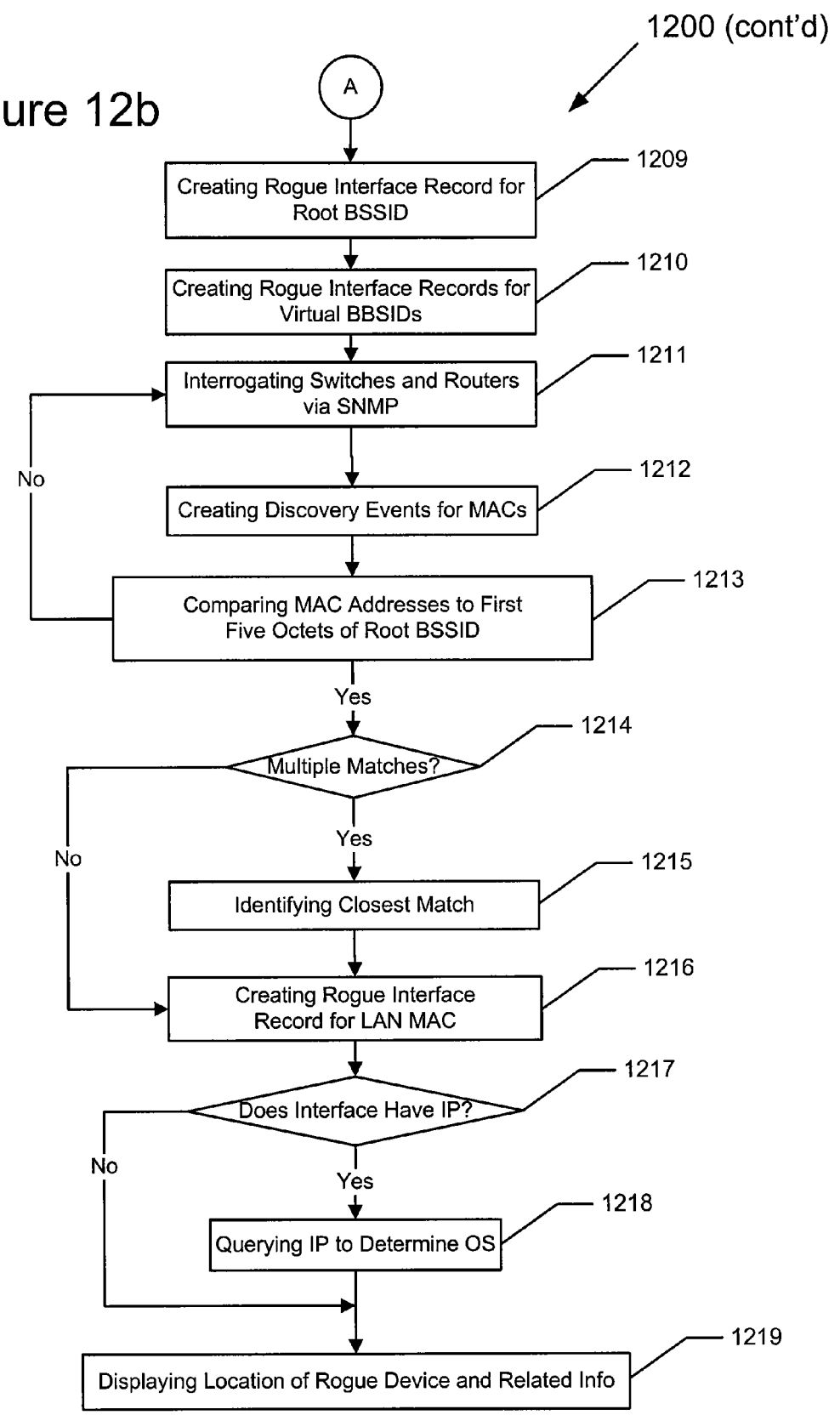

FIG. 12*b* is a continuation of the flow chart in FIG. 12*a*, which focuses on populating rogue interfaces related to the rogue device record created at Step 1208. In particular, after the rogue device record is created, the AMP creates a rogue interface record for the root BSSID for the rogue device (step 1209). The AMP further analyzes all discovery events for virtual BSSIDs related to the root BSSID and creates individual interfaces records indexed back to the rogue device record (step 1210). In general, virtual BSSIDs are generated if the end user programs the access point to have multiple networks. As such, the virtual BSSIDs would be based on the root BSSID and be associated to the different networks of the access point. Therefore, the rogue device record generated at step 1210 would identify the root BSSID and further include a list of all related virtual BSSIDs that are based on the root BSSID. One potential benefit of this feature is that the user is prevented from receiving numerous alerts, but rather receives a single alert that would contain a list of all wireless interfaces (BSSIDs) along with wired interfaces, which will now be discussed.

Referring back to FIG. 12*b*, the AMP searches for any wired MAC addresses associated with the root BSSID in the network (step 1211). The search comprises reading the switches' bridge forwarding tables and routers' address resolution protocol (ARP) tables to find all of the wired devices on the network. It is noted that the ARP tables kept in the network devices provide a means to map MAC addresses to IP addresses. Once the search is complete, a rogue discovery event is created at step 1212 for all identified wired MAC addresses.

The AMP then analyzes all of the wired discovery events in step 1213 to verify whether any of the LAN MAC addresses match the first five octets of the root BSSID of the rogue device record created in step 1208. If there are no matches, the AMP continues to search for any wired MAC addresses as discussed in step 1211. Otherwise, if there are any matches on the first five octets between the rogue device's root BSSID and the LAN MAC addresses in the rogue discovery event, then it is determined at step 1214 whether there are multiple matches. If so, the closest match to the root BSSIDs at step 1215. If there are not multiple matches, then the AMP creates a new rogue interface record bearing the closest of many or the only LAN MAC address matching the first five octets of the rogue device record's root BSSID (step 1216). It is noted that determining a matching for the first five octets is only one exemplary embodiment of the invention, however, the application is in no way intended to be limited to this embodiment.

Once this rogue interface record is created, the AMP sends a query to check if the rogue device contains an IP address (step 1217). If so, the AMP probes the IP address at step 1218 to determine if there are any open ports, which enables the determination of the operating system of the rogue device. As discussed above, a device running an embedded operating system like Linux™ or VxWorkS™ will be given a higher score (i.e., higher security risk assessment) than other non-embedded operating systems like MS Windows™, MS XP™, or MAC OS™.

At this point, all relevant information is compiled and indexed in a database. The information about each rogue device is displayed as a collection of many interfaces on a single screen in text or HTML (step 1219) as demonstrated by FIG. 15, which will be discussed below. By combining all of the interfaces into a single rogue device record, AMP can send a single alert that a particular rogue device has been detected.

FIG. 13 illustrates an exemplary screen display of data retrieved from the detected rogue device and a database created after completing analysis of the rogue device. The retrieved data may include information such as the BSSID, channel information, presence of security features and signal strength of the device. As further shown in FIG. 13, this information is stored in a database record. The database record includes the BSSID, score assigned, Rogue Radio ID, AP ID, and radio index for the device that detected the rogue device, as well as any other related information. As illustrated, the database record further stores wired information.

Figure 14:
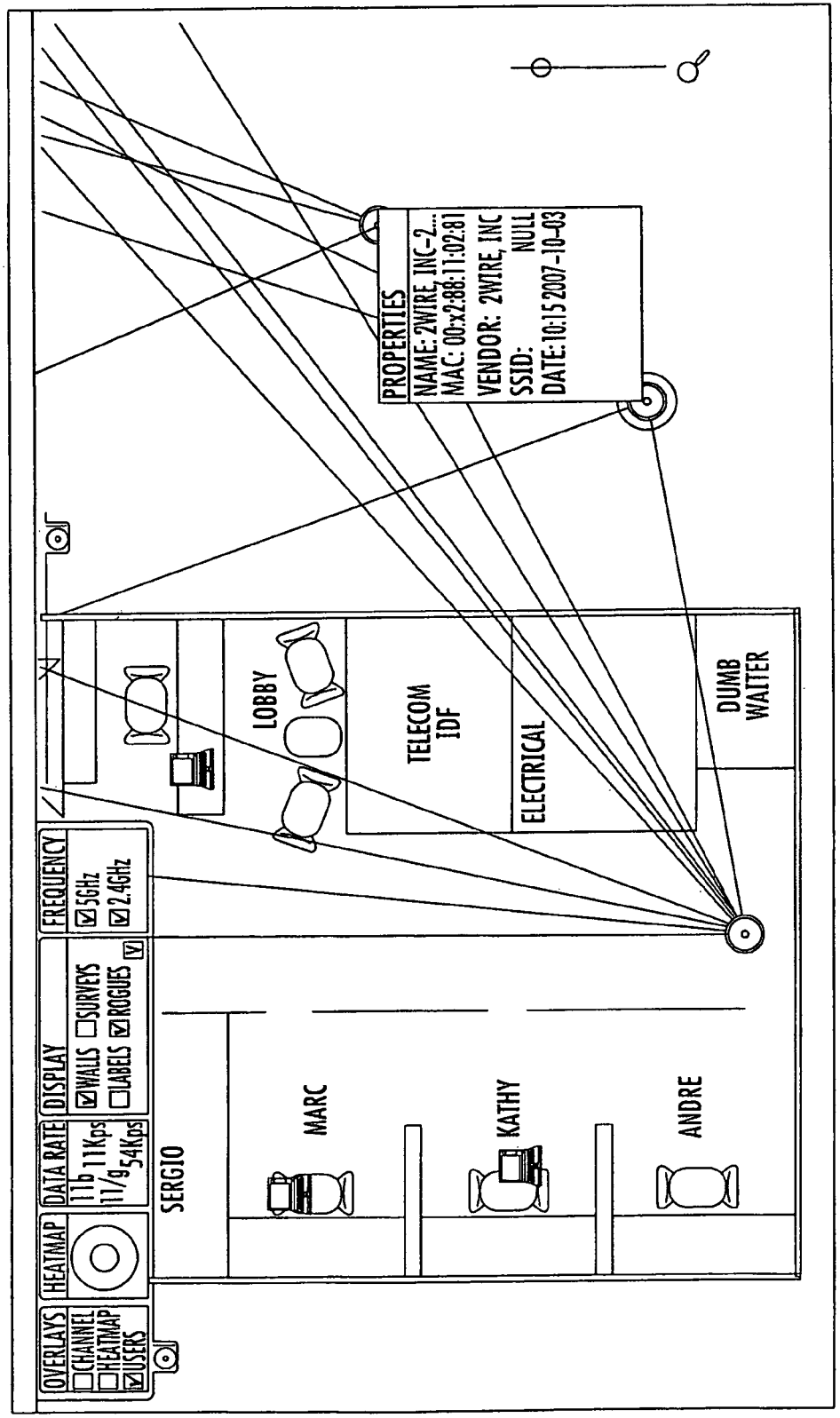
FIG. 14 illustrates a screen display showing location of devices in accordance with an exemplary embodiment.

FIG. 14 illustrates another screen display in accordance with an exemplary embodiment of the invention. As shown, the screen display portrays the location of rogue devices discovered during activities corresponding to Step 1219 of the foregoing method. This user-friendly display of the rogue device's location in a floor plan can assist IT personnel in physically locating the device. In addition, the screen display presents statistical information about the network as well as the location of the rogue devices and the corresponding properties of these rogue devices.

FIG. 15 illustrates yet another exemplary screen display in accordance with an embodiment of the invention. As shown, the screen display portrays a list of all interfaces on a rogue device as described above with respect to Step 1219 of the foregoing method. In one embodiment, if a user click on the icon labeled "View on Map", the screen display as shown in FIG. 14 is launched. As mentioned above, this screen display portrays the physical location of the particular rogue device.

Although the present invention has been described as operating in connection with wireless devices communicating via the 802.11b protocol, the present invention is in no way intended to be limited by such application. Rather, the present invention has application in a variety of computer network environments employing any suitable wireless physical and link layer protocols, such as 802.11a, 802.11b, 802.11g, MAC layer protocols 802.11d 802.11e 802.11h and 802.11i, and Radio Bands 2.4 GHz and 5 GHz. Further, although embodiments of the present invention have been described as operating in connection with SNMP, any suitable protocols can be used. In addition, although embodiments of the present invention have been described as operating in connection with a local area network, the present invention can be deployed across other computer networks, such as the Internet or other wide area networks.

Accordingly, the present invention has been described with reference to specific embodiments. Other embodiments of the present invention will be apparent to one of ordinary skill in the art. It is, therefore, intended that the claims set forth below not be limited to the embodiments described above.

APPENDIX A-MIB

```
//
//**************************************************************
*
// MIB Definition
//* SNMP Set request from AMP to AP that support AW MIB for Rogues
//* (1.3.6.1.4.12028.4.3(awAPMIB).4(beginRogueScan Set Request)
//
//**************************************************************
*
beginRogueScan   OBJECT IDENTIFIER ::={ awAPMIB 4}
packetsToCollect OBJECT-TYPE
```

APPENDIX A-MIB-continued

```
        SYNTAX    Integer
        MAX-ACCESS    read-write
        STATUS    current
        DESCRIPTION
            "The number of 802.11 packets to collect prior to moving channels"
    ::= { beginRogueScan 1 }
    secsToWaitPerChan OBJECT-TYPE
        SYNTAX    Integer
        MAX-ACCESS    read-write
        STATUS    current
DESCRIPTION
        "The number of seconds to listen on each channel"
    ::= { beginRogueScan 2 }
    channelBeginScan OBJECT-TYPE
        SYNTAX    Integer
        MAX-ACCESS    read-write
        STATUS    current
        DESCRIPTION
            "Starting Channel for scan"
    ::= { beginRogueScan 3 }
    channelEndScan OBJECT-TYPE
        SYNTAX    Integer
            MAX-ACCESS    read-write
        STATUS    current
        DESCRIPTION
            "Ending Channel for scan"
    ::= { beginRogueScan 4 }
    channelToSkip OBJECT-TYPE
        SYNTAX    Integer
        MAX-ACCESS    read-write
        STATUS    current
DESCRIPTION
    The number of channel to skip for each scan. 5 would
    get 1,6,11 for 802.11b in US"
    ::= { beginRogueScan 5 }
    numberOfIterations
        SYNTAX    Integer
        MAX-ACCESS    read-write
        STATUS    current
        DESCRIPTION
            "The number of iterations - meaning the AP would start
            @ channelBeginScan listening for packetsToCollect or
            secsToWaitPerChan and loop until channelEndScan for
            numberOfIterations iterations. The default value is
            1,99 will cause the AP to full time scan until next
            beginRogueScan is received   "
    ::= { beginRogueScan 6 }
//
//****************************************************************
*
// Rogue AP Data Traps generate by the AP and sent back to the AMP
//* //* (1.3.6.1.4.12028.4.3(awAPMIB).5(per row of data found)
//
//****************************************************************
*
//-- scanDataAP       OBJECT IDENTIFIER ::={ awAPMIB 5 }
awAPScanID OBJECT-TYPE
    SYNTAX    MacAddress
    MAX-ACCESS    read-only
    STATUS    current
    DESCRIPTION
        "The LAN MAC Address of the AP Performing the SCAN"
    ::= { scanDataAP 2}
awAPReturnBSSID OBJECT-TYPE
    SYNTAX    MacAddress
    MAX-ACCESS    read-only
    STATUS    current
    DESCRIPTION
        "The BSSID or Radio MAC of the Access Point discovered.
Only present on APs"
    ::= { scanDataAP 3 }
awAPReturnSSID OBJECT-TYPE
    SYNTAX    DisplayString
    MAX-ACCESS    read-only
    STATUS    current
    DESCRIPTION
        "The SSID of the Access Point discovered."
    ::= { scanDataAP 4 }
awAPReturnChannel OBJECT-TYPE
    SYNTAX    INTEGER
    MAX-ACCESS    read-only
    STATUS    current
    DESCRIPTION
        "The Channel contained only in Beacon Packets.
    Program could guess by data packets collected
    on Channels 5,6, & 7 one could surmise that
    the client is on channel 6."
    ::= { scanDataAP 5 }
awAPReturnWEPOn OBJECT-TYPE
    SYNTAX    INTEGER {(1) False, (2) True]
    MAX-ACCESS    read-only STATUS    current
    DESCRIPTION
        "1 indicates WEP is & 2 indicates WEP is on"
    ::={ scanDataAP 6 }
awAPReturnType OBJECT-TYPE
    SYNTAX    INTEGER {(1) AP,(2) Client,(3) Adhoc, (4) Bridge }
    MAX-ACCESS    read-only
    STATUS    current
    DESCRIPTION
        "Type of device picked up on scan"
    ::={ scanDataAP 7}
awAPReturnRSSI OBJECT-TYPE
    SYNTAX    INTEGER
    MAX-ACCESS    read-only
    STATUS    current
    DESCRIPTION
        "Relative Signal Strength"
    ::- { scanDataAP 8 ]
awAPReturnClMAC OBJECT-TYPE
    SYNTAX    MacAddress
    MAX-ACCESS    read-only
    STATUS    current
    DESCRIPTION
        "MAC address of client wireless NIC - only valid for
    client devices."
    ::= { scanDataAP 9 }
scanDataRow NOTIFICATION-TYPE
OBJECTS { awAPScanId, awAPReturnBSSID,
        awAPReturnSSID,
            awAPReturnChannel,
            awAPReturnWepOn,
        awAPReturnType,
        awAPReturnRSSI
        awAPReturnClMAC}
STATUS    current
DESCRIPTION
        "This trap is sent for AP and client observed in the BSA."
::= { scanDataAP 1}
//
//****************************************************************
*
// * SNMP trap from AP to AMP
// * (1.3.6.1.4.12028.4.3(awAPMIB).6(endRogueScan Set Request)
//
//****************************************************************
*
// endRogueScan    OBJECT IDENTIFIER::- { awAPMIB 6 ]
awAPScanDuration OBJECT-TYPE
    SYNTAX    INTEGER
    MAX-ACCESS    read-only
    STATUS    current
    DESCRIPTION
        "Total duration of scan in seconds"
    ::= { endRogueDuration 2 }
awAPTotTraps OBJECT-TYPE
    SYNTAX    INTEGER
    MAX-ACCESS    read-only
    STATUS    current
    DESCRIPTION
        "Total traps(devices) sent to the AMP"
    ::= { endRogueDuration 3 }
endRogueScan NOTIFICATION-TYPE
    OBJECTS { awAPScanId,
        awAPScanDuration,
        awAPScanTotTraps]
    STATUS    current
    DESCRIPTION
        "This trap is sent for AP and client observed in the BSA."
    ::= { endRogueScan 1}
```

What is claimed is:

1. A computer implemented method, comprising:

receiving, at a computing device connected to a network, a wireless Media Access Control (MAC) address for a wireless device connected to the network, wherein the wireless MAC address for the wireless device corresponds to a manufacturer for the wireless device;

determining that the wireless device is a rogue wireless device, wherein determining includes comparing the wireless MAC address for the wireless device with a list of valid wireless MAC addresses used by authorized wireless devices connected to the network;

determining a list of wired MAC addresses used by devices connected to the network using wired connections;

determining that elements of the wireless MAC address for the rogue wireless device match elements of a wired MAC address, wherein determining includes comparing elements of the wireless MAC address for the rogue wireless device with elements of the wired MAC addresses on the list of wired MAC addresses;

determining that the rogue wireless device is connected to the network over a wired connection based on the match;

assigning a security risk score to the rogue wireless device, wherein assigning includes using the wireless MAC address corresponding to the manufacturer; and displaying the security risk score.

2. The method of claim 1, further comprising:
identifying a network address for a wired network connection of the rogue wireless device.

3. The method of claim 2, further comprising:
probing the network address to identify an operating system for the rogue wireless device; and
updating the security score for the rogue wireless device based on the operating system.

4. The method of claim 3, further comprising:
updating or creating a record associated with the rogue wireless device, wherein the record includes the wireless MAC address for the wireless device, the network address for the wired connection of the rogue wireless device, the operating system for the rogue wireless device, and the security score for the rogue wireless device.

5. The method of claim 1, further comprising:
determining a location of the rogue wireless device, wherein determining the location of the rogue wireless device includes using a wireless triangulation method to locate the rogue wireless device; and
displaying the location of the rogue wireless device.

6. The method of claim 1, wherein determining that the rogue wireless device is connected to the network over a wired connection includes matching a manufacturer for the wireless device with a manufacturer corresponding to one or more wired MAC addresses in the list.

7. The method of claim 1, wherein determining the list includes reading bridge forwarding tables or address resolution protocol tables of one or more network devices connected to the network.

8. A system comprising:
one or more processors;
a non-transitory computer readable medium communicatively coupled to the one or more processors, the non-transitory computer readable medium including instructions that, when executed by the one or more processors, cause the one or more processors to perform operations including:
receiving a wireless Media Access Control (MAC) address for a wireless device connected to a network, wherein the wireless MAC address for the wireless device corresponds to a manufacturer for the wireless device;

determining that the wireless device is a rogue wireless device, wherein determining includes comparing the wireless MAC address for the wireless device with a list of valid wireless MAC addresses used by authorized wireless devices connected to the network;

determining a list of wired MAC addresses used by devices connected to the network using wired connections;

determining that elements of the wireless MAC address for the rogue wireless device match matches elements of a wired MAC address, wherein determining includes comparing elements of the wireless MAC address for the rogue wireless device with elements of the wired MAC addresses on the list of wired MAC addresses;

determining that the rogue wireless device is connected to the network over a wired connection based on the match;

assigning a security risk score to the rogue wireless device, wherein assigning includes using the wireless MAC address corresponding to the manufacturer; and displaying the security risk score.

9. The system of claim 8, wherein the operations further include:
identifying a network address for a wired network connection of the rogue wireless device.

10. The system of claim 9, wherein the operations further include:
probing the network address to identify an operating system for the rogue wireless device; and
updating the security score for the rogue wireless device based on the operating system.

11. The system of claim 10, wherein the operations further include:
updating or creating a record associated with the rogue wireless device, wherein the record includes the wireless MAC address for the wireless device, the network address for the wired connection of the rogue wireless device, the operating system for the rogue wireless device, and the security score for the rogue wireless device.

12. The system of claim 8, wherein determining that the rogue wireless device is connected to the network over a wired connection includes matching the manufacturer for the wireless device with a manufacturer corresponding to one or more wired MAC addresses in the list.

13. The system of claim 8, wherein determining the list includes reading bridge forwarding tables or address resolution protocol tables of one or more network devices connected to the network.

14. The system of claim 8, wherein the operations further include:
determining a location of the rogue wireless device, wherein determining the location of the rogue wireless device includes using a wireless triangulation method to locate the rogue wireless device; and
displaying the location of the rogue wireless device.

15. A non-transitory computer readable medium comprising instructions that, when executed by one or more processors, cause the one or more processors to perform operations including:
receiving a wireless Media Access Control (MAC) address for a wireless device connected to a network, wherein the wireless MAC address for the wireless device corresponds to a manufacturer for the wireless device;

determining that the wireless device is a rogue wireless device, wherein determining includes comparing the wireless MAC address for the wireless device with a list of valid wireless MAC addresses used by authorized wireless devices connected to the network;

determining a list of wired MAC addresses used by devices connected to the network using wired connections;

determining that elements of the wireless MAC address for the rogue wireless device match elements of a wired MAC address, wherein determining includes comparing elements of the wireless MAC address for the rogue wireless device with elements of the wired MAC addresses on the list of wired MAC addresses;

determining that the rogue wireless device is connected to the network over a wired connection based on the match;

assigning a security risk score to the rogue wireless device, wherein assigning includes using the wireless MAC address corresponding to the manufacturer; and displaying the security risk score.

16. The non-transitory computer readable medium of claim 15, further comprising instructions that, when executed by the one or more processors, cause the one or more processors to perform operations including:
identifying a network address for a wired network connection of the rogue wireless device.

17. The non-transitory computer readable medium of claim 15, further comprising instructions that, when executed by the one or more processors, cause the one or more processors to perform operations including:
probing the network address to identify an operating system for the rogue wireless device; and
updating the security score for the rogue wireless device based on the operating system.

18. The non-transitory computer readable medium of claim 17, further comprising instructions that, when executed by the one or more processors, cause the one or more processors to perform operations including:
updating or creating a record associated with the rogue wireless device, wherein the record includes the wireless MAC address for the wireless device, the network address for the wired connection of the rogue wireless device, the operating system for the rogue wireless device, and the security score for the rogue wireless device.

19. The non-transitory computer readable medium of claim 15, wherein determining that the rogue wireless device is connected to the network over a wired connection includes matching the manufacturer for the wireless device with a manufacturer corresponding to one or more wired MAC addresses in the list.

20. The non-transitory computer readable medium of claim 15, wherein determining the list includes reading bridge forwarding tables or address resolution protocol tables of one or more network devices connected to the network.

21. The non-transitory computer readable medium of claim 15, further comprising instructions that, when executed by the one or more processors, cause the one or more processors to perform operations including:
determining a location of the rogue wireless device, wherein determining the location of the rogue wireless device includes using a wireless triangulation method to locate the rogue wireless device; and
displaying the location of the rogue wireless device.

* * * * *